(12) United States Patent
Terashima et al.

(10) Patent No.: US 7,657,328 B2
(45) Date of Patent: Feb. 2, 2010

(54) DEVICE CONTROL SYSTEM, DEVICE CONTROL METHOD, AND CONTROL PROGRAM

(75) Inventors: Yoshiki Terashima, Kawasaki (JP); Keiichi Teramoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 475 days.

(21) Appl. No.: 11/319,180

(22) Filed: Dec. 28, 2005

(65) Prior Publication Data

US 2006/0168635 A1 Jul. 27, 2006

(30) Foreign Application Priority Data

Jan. 14, 2005 (JP) .............................. 2005-007922

(51) Int. Cl.
*G05B 19/18* (2006.01)
*H04B 1/10* (2006.01)
*H04N 7/173* (2006.01)

(52) U.S. Cl. .............................. 700/6; 725/63; 725/109; 455/302; 455/306; 455/418

(58) Field of Classification Search .................. 725/93, 725/109, 110, 112, 146, 63; 700/6; 455/302, 455/306, 418
See application file for complete search history.

(56) References Cited

U.S. PATENT DOCUMENTS

2003/0227645 A1* 12/2003 Hisatomi et al. ........... 358/1.13

2007/0035668 A1* 2/2007 Swidler ....................... 348/738
2008/0025702 A1* 1/2008 Nishi ........................... 386/124

FOREIGN PATENT DOCUMENTS

| JP | 2001-333030 | 11/2001 |
|----|-------------|---------|
| JP | 2002-208899 | 7/2002 |
| JP | 2003-324402 | 11/2003 |
| JP | 2005-4916 | 1/2005 |
| JP | 2005-5749 | 1/2005 |
| WO | WO 2005/003921 A2 | 1/2005 |

OTHER PUBLICATIONS

Haruo Okuda, et al. "Transmission Path of Home Network," Home Network and Home Server, Shokodo Co., Ltd., 1st Edition, The Institute of Image Information and Television Engineers, May 25, 2000, pp. 52-68.

* cited by examiner

*Primary Examiner*—Paul L Rodriguez
*Assistant Examiner*—Sheela Rao
(74) *Attorney, Agent, or Firm*—Oblon, Spivak, McClelland, Maier & Neustadt, L.L.P.

(57) ABSTRACT

According to an aspect of the present invention, there is provided with a device control system including: an acquiring unit which acquires a BML document which can be delivered in digital broadcasting; a BML interpreting unit which interprets a description described in the BML document, for controlling an external device; and a communication unit which communicates with the external device on the basis of a result of interpretation by the BML interpreting unit.

15 Claims, 23 Drawing Sheets rangeA3.bml

```
<?xml version="1.0" encoding="EUC-JP" >
<!DOCTYPE bml PUBLIC "+/ARIB STD-B24:1999//DTD BML Document//JA" "bml_1_0.dtd" >
<?bml bml-version="1.0" ?>
<bml>
<head></head>
<body style="resolution:960x540;" >
<div>
<objecct type="video/X-arib-mpeg2" data="/00"
style="left:10px;top:10px;width:200px;heght:100px;" remain />
<p>COOKING IS COMPLETED</p>
</div>
</body>
</bml>
```

FIG. 23

DEVICE CONTROL SYSTEM, DEVICE CONTROL METHOD, AND CONTROL PROGRAM

CROSS-REFERENCE TO RELATED APPLICATIONS

This application claims the benefit of priority under 35USC § 119 to Japanese Patent Application No. 2005-007922 filed on Jan. 14, 2005, the entire contents of which are incorporated herein by reference.

BACKGROUND OF THE INVENTION

1. Field of the Invention

The present invention relates to a device control system, a device control method, and a control program which controls a device connected to a network on the basis of information constituting broadcast contents.

2. Related Art

With digital broadcasting of television, a television for digital broadcasting (to be referred to as a digital television hereinafter) has been popularized. In the digital broadcasting, not only ordinary video contents but also various multimedia data such as a still image, audio information, and character information can be included in contents. For example, contents which reflect an interaction such as a remote control input by a user on a screen and a service which controls a device on the basis of the interaction are provided from a broadcasting station.

For example, in Japanese Patent Application Laid-open (JP-A) No. 2001-333030, an operation control signal to operate an in-house device depending on program contents is delivered together with program data of a broadcast program to transmit the control signal to the in-house device at a broadcast timing of a certain scene of the program. In this manner, a system which realizes such an additional service that the temperature of an air-conditioner is increased at a shot at which a hot scene is broadcasted is provided.

In Japanese Patent Application Laid-open (JP-A) No. 2002-208899, as a means of controlling a device externally connected to a digital broadcasting receiver, a method by transmitting and receiving an XML document in which a control parameter is set is proposed.

According to digital broadcasting, a cooperation between a program and an in-house device can be realized at a limited area. However, in a form that program data and a control signal are independent as in JP-A 2001-333030, a service which issues a control instruction at an arbitrary timing in a user operation or which changes a display depending on an execution result of a control instruction or a notification content cannot be realized. In addition, in relation to JP-A 2002-208899, according to a specification on which the invention is based, a describing means used to control a device disclosed in JP-A 2002-208899 is not practically operated because a manner of interpreting a description content and a control means for controlling the in-house device are not defined. More specifically, in a case of realizing control of these in-house devices and an operation of detecting interruption from a device, control except for control in an extent depending on an implementation and a specification unique to each device to be controlled cannot be performed. For example, it is virtually impossible to realize such an operation that a list of devices which can communicate with a digital television is acquired.

SUMMARY OF THE INVENTION

According to an aspect of the present invention, there is provided with a device control system comprising: an acquiring unit which acquires a BML document which can be delivered in digital broadcasting; a BML interpreting unit which interprets a description described in the BML document, for controlling an external device; and a communication unit which communicates with the external device on the basis of a result of interpretation by the BML interpreting unit.

According to an aspect of the present invention, there is provided with a device control method comprising: acquiring a BML document which can be delivered in digital broadcasting; interpreting a description described in the BML document, for controlling an external device; and communicating with the external device on the basis of a result of interpretation in accordance with a predetermined protocol.

According to an aspect of the present invention, there is provided with a control program for inducing a computer to execute: acquiring a BML document which can be delivered in digital broadcasting; interpreting a description described in the BML document, for controlling an external device; and communicating with the external device on the basis of a result of interpretation in accordance with a predetermined protocol.

BRIEF DESCRIPTION OF THE DRAWINGS

FIG. 23 is a diagram showing still another example of the BML document in the modification of the embodiment.

DETAILED DESCRIPTION OF THE INVENTION

In digital broadcasting, in order to construct contents, a descriptive language called BML (Broadcast Markup Language) established as a standard of measure by ARIB (Association of Radio Industries and Businesses) is used. The BML is a contents descriptive language established on the basis of XML (Extensible Markup Language) and oriented to digital broadcasting and includes a function of designating an arrangement position of multimedia data, a script executing function by ECMAScript serving as a standard of measure of JavaScript (R), a function of operating XML by DOM (Document Object Model), and the like. Furthermore, BML includes a function which can be used from ECMAScript and a broadcasting extended function such as execution of reservation for recording a broadcast program.

A digital television has a BML browser. The BML browser interprets a BML document created by a broadcasting station and delivered through a broadcast wave to execute display of contents according to a tag included in the BML document or a service by ECMAScript.

On the other hand, in recent years, in-house devices such as AV devices and white goods are increasingly networked. A protocol such as UPnP (Universal Plug and Play) is used as a standard to control the in-house devices through the network. The UPnP is considered to be one of device control protocols used in a home network installed in a house having mechanisms such as a device detecting mechanism, a device control mechanism, and a notification mechanism.

FIRST EMBODIMENT

An example of a device control system according to the present invention will be described below with reference to the accompanying drawings.

Figure 1:
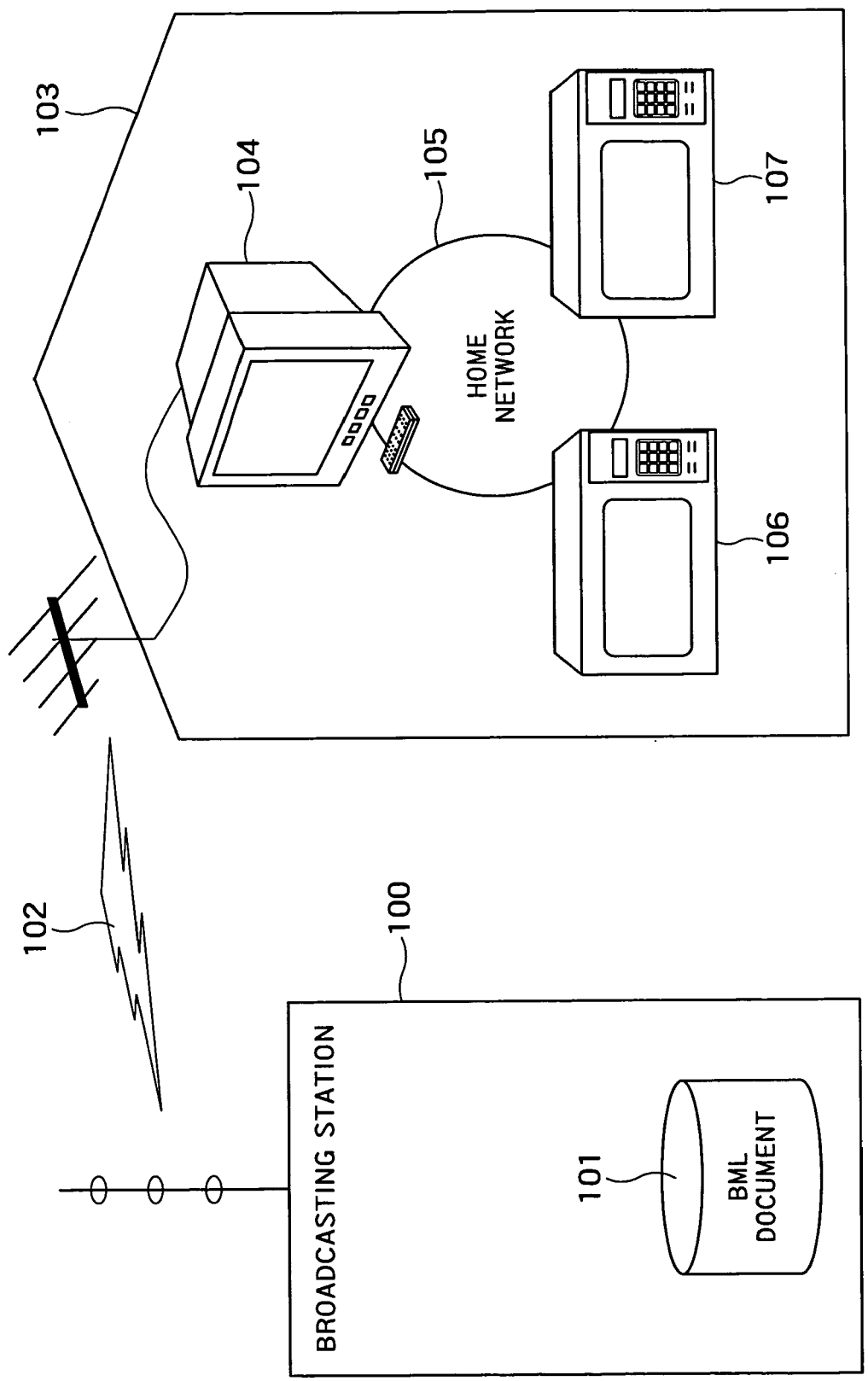
FIG. 1 is a diagram showing an example of a device control system according to a first embodiment.

FIG. 1 is a diagram showing an example of the device control system according to the embodiment. In FIG. 1, a broadcasting station 100 which delivers contents including a BML document, a BML document DB101 which stores a BML document in which pieces of control information are described, a broadcast wave 102 which delivers digital broadcasting, a subscriber 103 which receives delivery of the broadcast wave 102, a digital television 104, a home network 105, and microwave ovens A106 and B107 connected to the home network 105 are shown.

The broadcasting station 100 delivers digital broadcasting to the subscriber 103 through the broadcast wave 102. At this time, the broadcasting station 100 can deliver a BML document stored in the BML document DB101 as one of contents as needed.

The BML document DB101 stores a BML document delivered by the broadcast wave 102. In the BML document, in addition to a normally supposed BML description such as a arrangement position of delivered contents on a screen of the digital television 104, a description to control devices such as the microwave oven A106 on the home network is included.

The broadcast wave 102 means a broadcast wave of digital broadcasting delivered to the subscriber 103.

The subscriber 103 is a user who receives the broadcast wave 102 and a person who owns the right of receiving the broadcast wave 102 and equipment therefor regardless of being charged or uncharged in response to delivery.

The digital television 104 is a television which receives digital broadcasting delivered by the broadcast wave 102 and can communicate with the microwave ovens A106 and B107 through the home network 105.

The home network 105 is a network installed in the house of the subscriber 103. For example, the home network 105 may be any one of a wired LAN and a wireless LAN which is regulated by IEEE802.11x. Any communication medium in which devices installed in the house communicate with each other may be used.

The microwave oven A106 and the microwave oven B107 are microwave ovens having functions of being capable of communicating another device through the home network 105.

Figure 2:
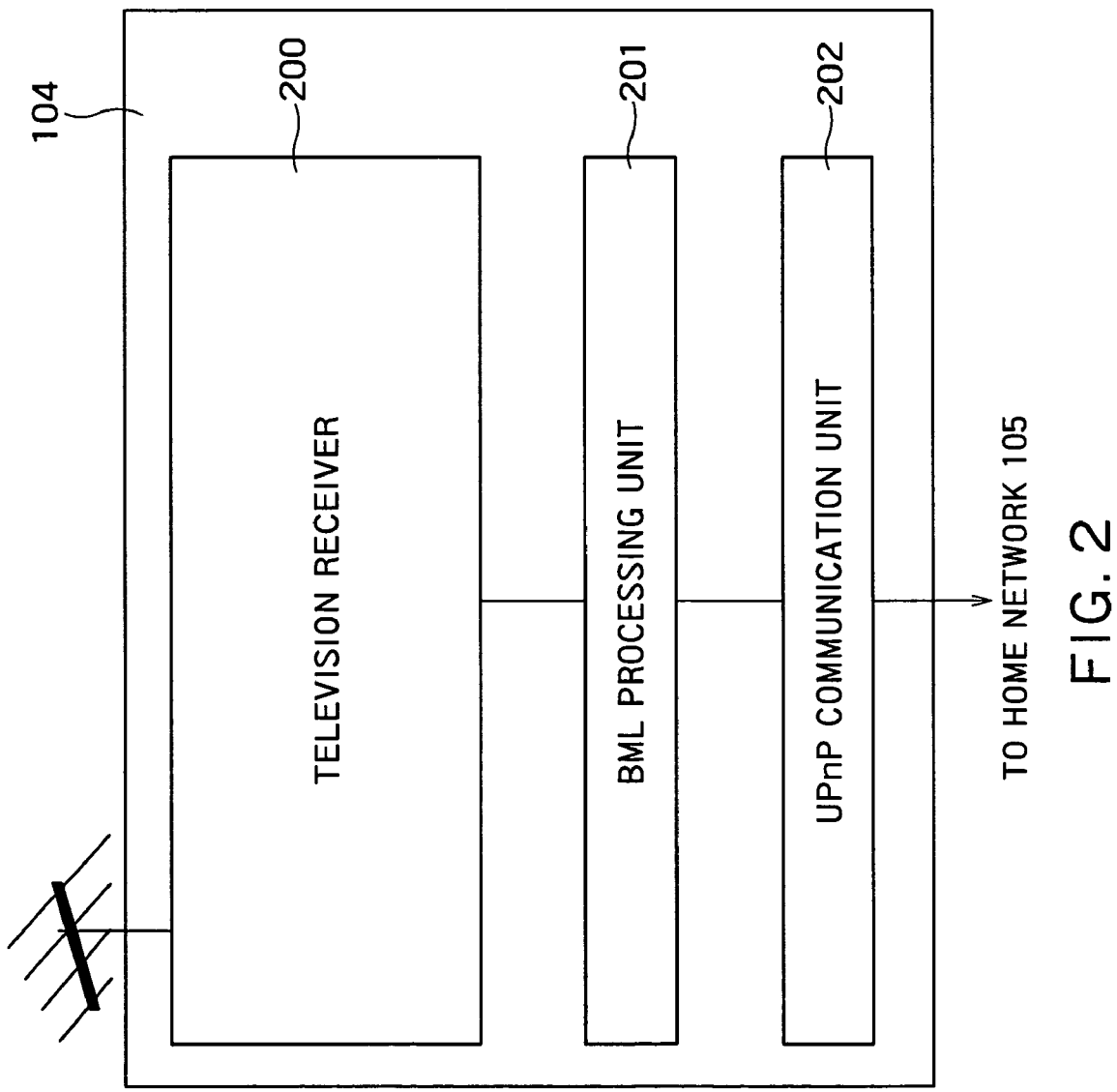
FIG. 2 is a diagram showing an example of a block diagram of a digital television according to the first embodiment.

FIG. 2 is a diagram showing an example of a block diagram of the digital television 104 in the embodiment. FIG. 2 shows a television receiver 200, a BML processing unit 201, and a UPnP communication unit 202.

The television receiver 200 has a function which receives the broadcast wave 102 of digital broadcasting delivered from the broadcasting station 100 to display a video signal on a display unit such as a cathode-ray tube held by the television receiver 200. The television receiver 200 also has a function which separates the BML document included in the broadcast wave 102 to give the BML document to the BML processing unit 201. Since data of digital broadcasting is delivered together with a mixture of a BML document, video data, audio data, and the like, the television receiver 200 requires a function of receiving data of digital broadcasting, a function of separating the pieces of information, a function of decoding a video signal, a function of reproducing the video signal, and the like. However, these functions will be not explained below in detail because the functions are realized as known techniques.

The BML processing unit 201 has a function of interpreting the received BML document to execute analysis of a tag in the BML document and script described by ECMAScript. When a description (for example, a description of an external device control function or an interruption detecting mechanism from an external device) for controlling an external device defined by the BML document, targeted to a device compatible with UPnP is present in the BML document, the BML processing unit 201 extracts information required for communication by UPnP such as an argument given to the description. The BML processing unit 201 converts the value as needed to give the converted value to the UPnP communication unit 202. When the UPnP communication unit 202 receives a message from another device compatible with UPnP, the UPnP communication unit 202 has a function which extracts a communication information such as a result of success and failure of control as a return value or the like of a function of ECMAScript and converts the communication information in such a form that can be handled as a BML document. In the embodiment, the BML processing unit 201 uses enumPeripherals( ) defined by BML as an external device control function. The BML processing unit 201 serves as a controller for the UPnP communication unit 202.

The UPnP communication unit 202 has a function which communicates with, for example, the microwave oven A106 through the home network 105 by a protocol conforming to UPnP depending on a designation of the BML processing unit 201. As functions realized by UPnP, a function which responds to a search request message of a device to notify that the device is present on the home network 105, is kwon. Also, for example, a function which receives and transmits a control message for setting a recipe and transmits a cooking completed message for notifying a completion of cooking, is known. In the embodiment, the UPnP communication unit 202 communicates with devices connected to the home network 105 by using a protocol conforming to UPnP. However, any protocol which can realize communication with the devices on the home network 105 on the basis of a designation from the BML processing unit 201 may be used.

Figure 3:
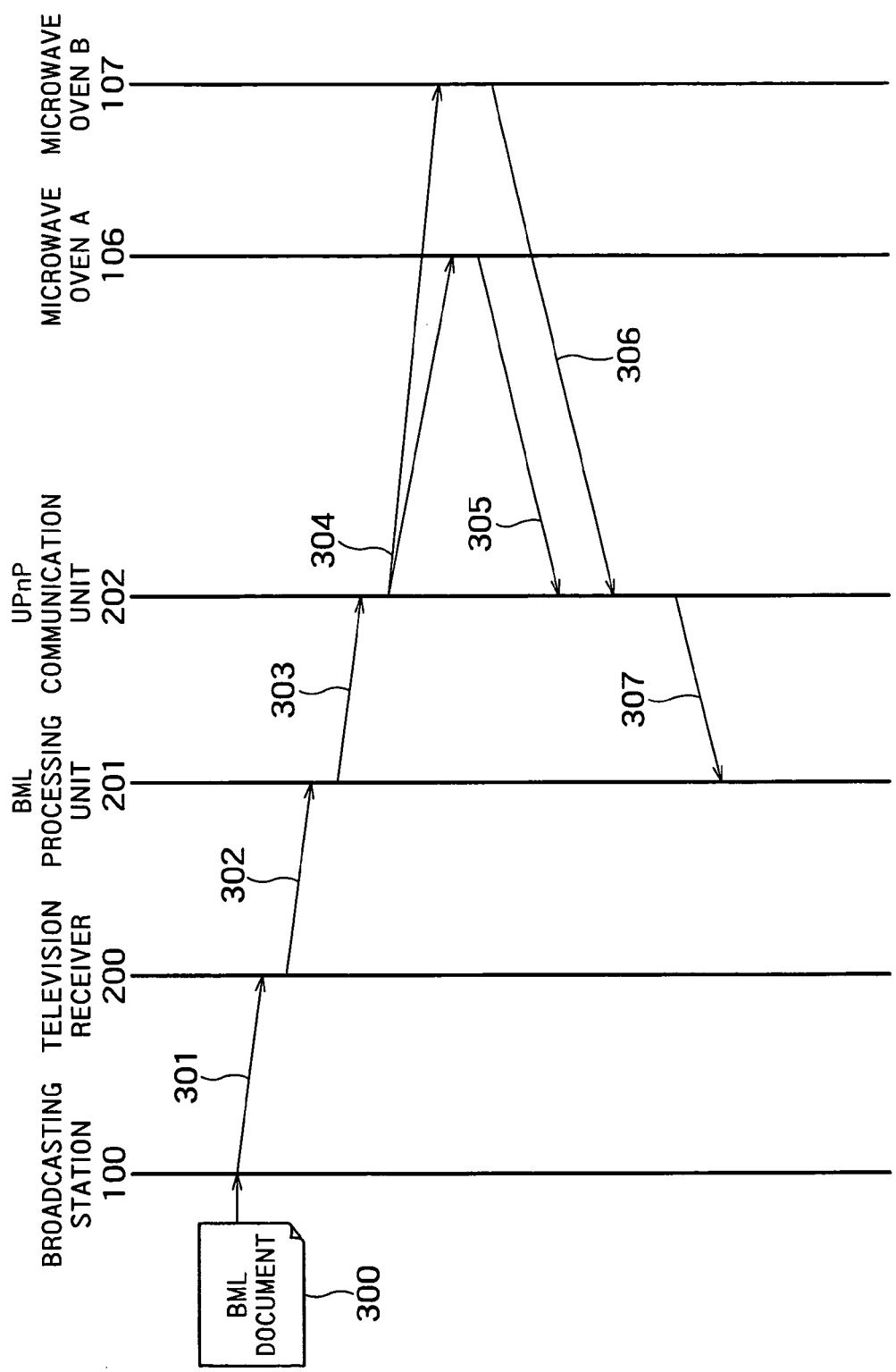
FIG. 3 is a diagram showing a flow chart for detecting a device by the device control system according to the first embodiment.

FIG. 3 shows an example of a flow chart for detecting a device by the device control system according to the embodiment. First, a BML document 300 including an external device control function (enumPeripherals( )) is delivered from the broadcasting station 100 as a broadcast wave 301. When the digital television 104 receives the BML document 300, the television receiver 200 separates the BML document 300 from the broadcast wave 301 to give the BML document 300 to the BML processing unit 201 as BML document information 302.

The BML processing unit 201 displays a screen depending on a tag described in the received BML document information 302 and executes ECMAScript. When the external device control function is described in the BML document information 302, the BML processing unit 201 issues a command 303 depending on the description of the function to the UPnP communication unit 202.

When the UPnP communication unit 202 receives the command 303, the UPnP communication unit 202 creates a search request 304 conforming to SSDP (Simple Service Discovery Protocol) on the basis of the content of the command 303 and multicasts the search request 304 onto the home network 105.

The microwave oven A106 and the microwave oven B107 serving as devices compatible with UPnP respond to the search request 304 to transmit each unique LOCATION or each USN (Unique Service Name) as a search response 305 or 306. The UPnP communication unit 202 which receives the information returns the received information to the BML processing unit 201 as an execution result 307 of the external device control function (enumPeripherals( )). It is assumed that the UPnP device has an XML document called a description in which information such as its own device name, a device to be provided, or a service to be provided is shown, as a specification of UPnP. The LOCATION is a URL (Uniform Resource Location) indicating the location of the XML document.

The details of information received and transmitted in the flow will be described below.

In the embodiment, an input/output specification of the external device control function (enumPeripherals( )) is defined as follows.

Function: Devices which can communicate by using UPnP and are compatible with UPnP are cited.
Syntax: Array enumperipherals (input String ST)
Argument:
ST Search target expressed by URI
Return Value: Array object having elements in each of which Location is stored: success
null: failure
Explanation: Device having USN (Unique Service Name) corresponding to a target name given by the argument ST, a service is searched for by SSDP. The ST can designate the following character strings:
ssdp:all
upnp: rootdevice
uuid:device-UUID (device-UUID is arbitrary)
urn:schemas-upnp-org:device:deviceType:v (deviceType:v is arbitrary)
urn:schemas-upnp-org:service:serviceType:v (serviceType:v is arbitrary)

The return value is an Array object having elements the number of which is equal to the number of detected devices and detected services, and each element has a URL in which a description of each detected device is stored as a character string.

Figure 4:
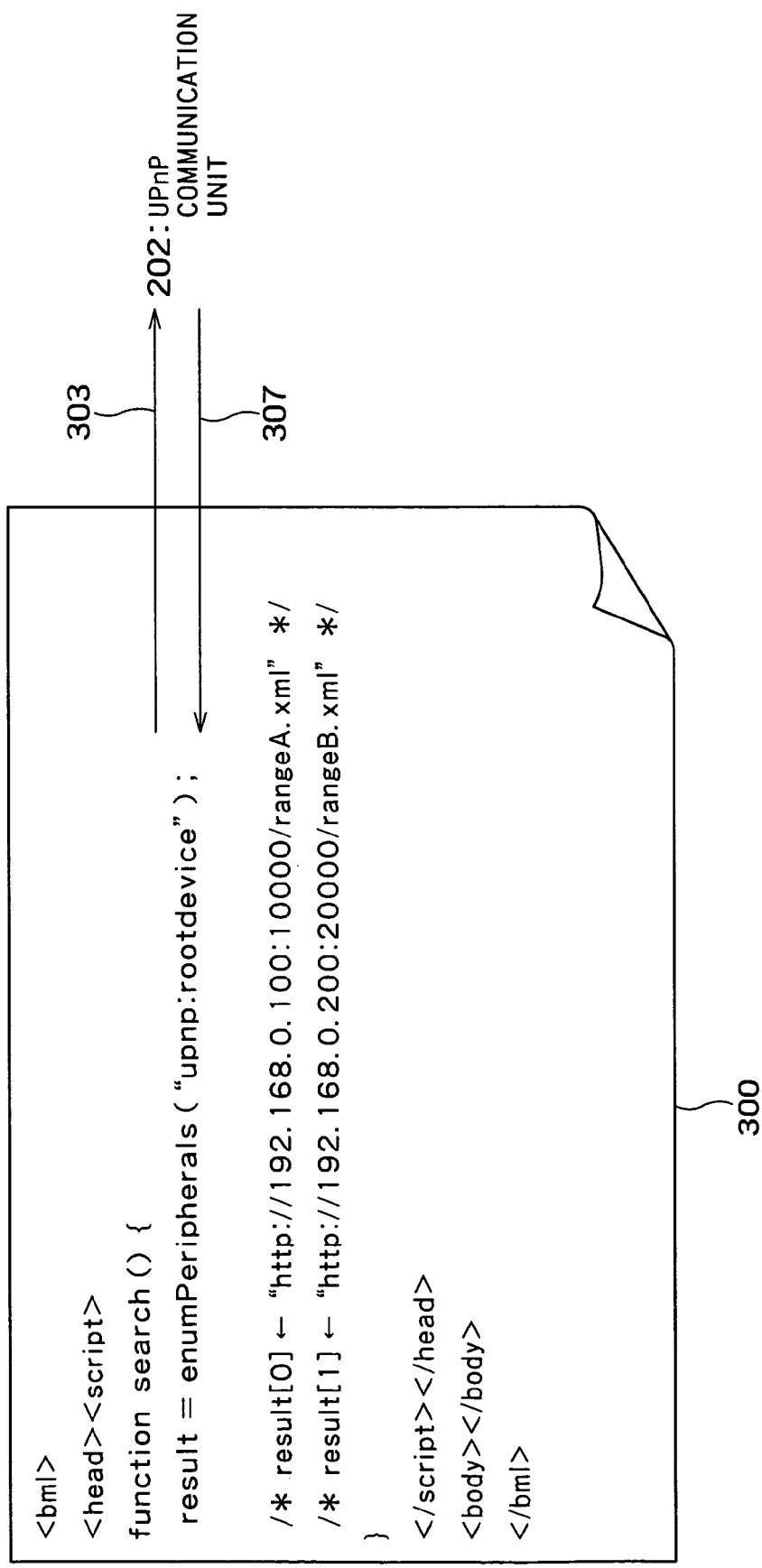
FIG. 4 is a diagram showing an example of a BML document in the first embodiment.

FIG. 4 is a diagram showing an example of the BML document 300 to detect a device by the device control system according to the embodiment. In an actual BML document, an xml declaration, a DTD declaration, a bml declaration, designation of a style sheet, and the like are necessary. However, the declarations, the designation, and the like are omitted for descriptive convenience. An example of a value supposed as a return value of the execution result of enumPeripherals( ) is described in the form of a comment text by using symbols /* . . . */. As a matter of course, the comment text does not influence the execution of the script at all, and does not need to be described in an actual BML document.

The BML processing unit 201 interprets the description of the argument of enumPeripherals( ) of the BML document 300 to issue the command 303 to the UPnP communication unit 202. The BML processing unit 201 receives an execution result 307 serving as a response from the UPnP communication unit 202 to the command 303 to store the result in "result". In this case, since the devices compatible with UPnP on the home network 105 are the two microwave ovens A106 and B107, two values result[0] and result[1] are stored as return values.

Figure 5:
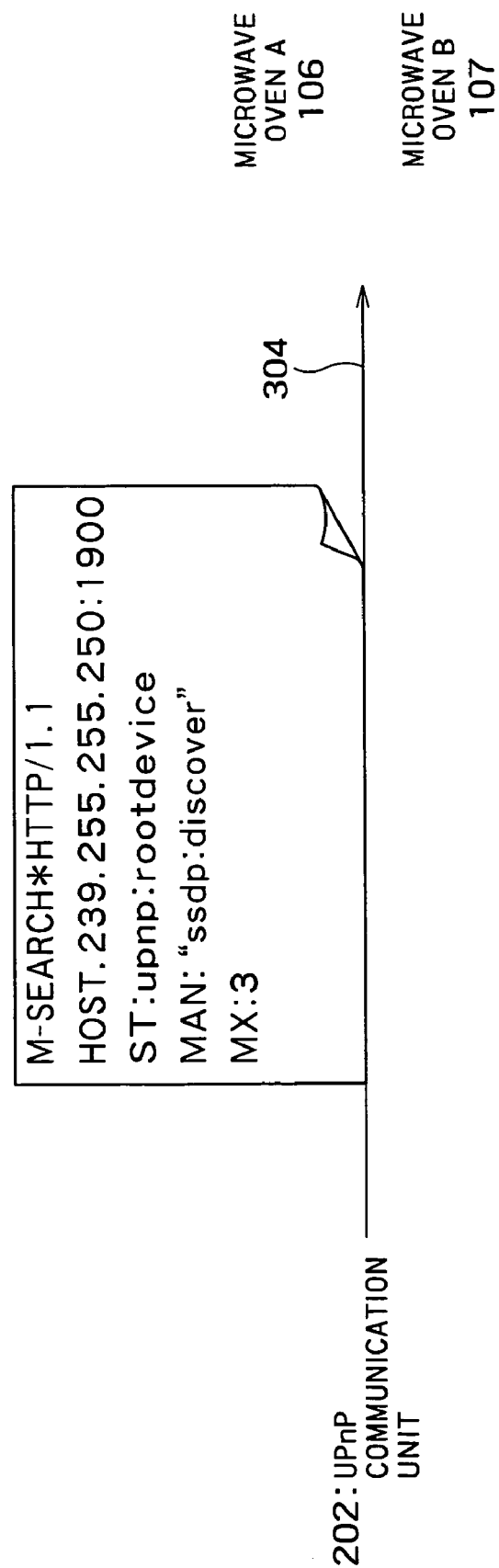
FIG. 5 is a diagram showing an example of search request by UPnP in the first embodiment.

FIG. 5 is a diagram showing an example of the search request 304 transmitted by the UPnP communication unit 202 which receives the command 303. In the embodiment, a service search object is designated in searching by SSDP, and a message (search request) of the service search request is transmitted into the network by SSDP/HTTPMU. When a device which receives the service search request and is compatible with UPnP coincides with the search object, the device returns a response by SSDP/HTTPMU. In FIG. 5, as a part "upnp:rootdevice" in ST:upnp:rootdevice, a value equal to the argument of enumPeirpherals( ) is stored. Reference symbol HOST denotes a UPnP multicast address determined as a fixed value, reference symbol MAN denotes a fixed value "ssdp:discover" indicating device detection, and reference symbol MX denotes time (fixed value), for waiting for a response.

Figure 6:
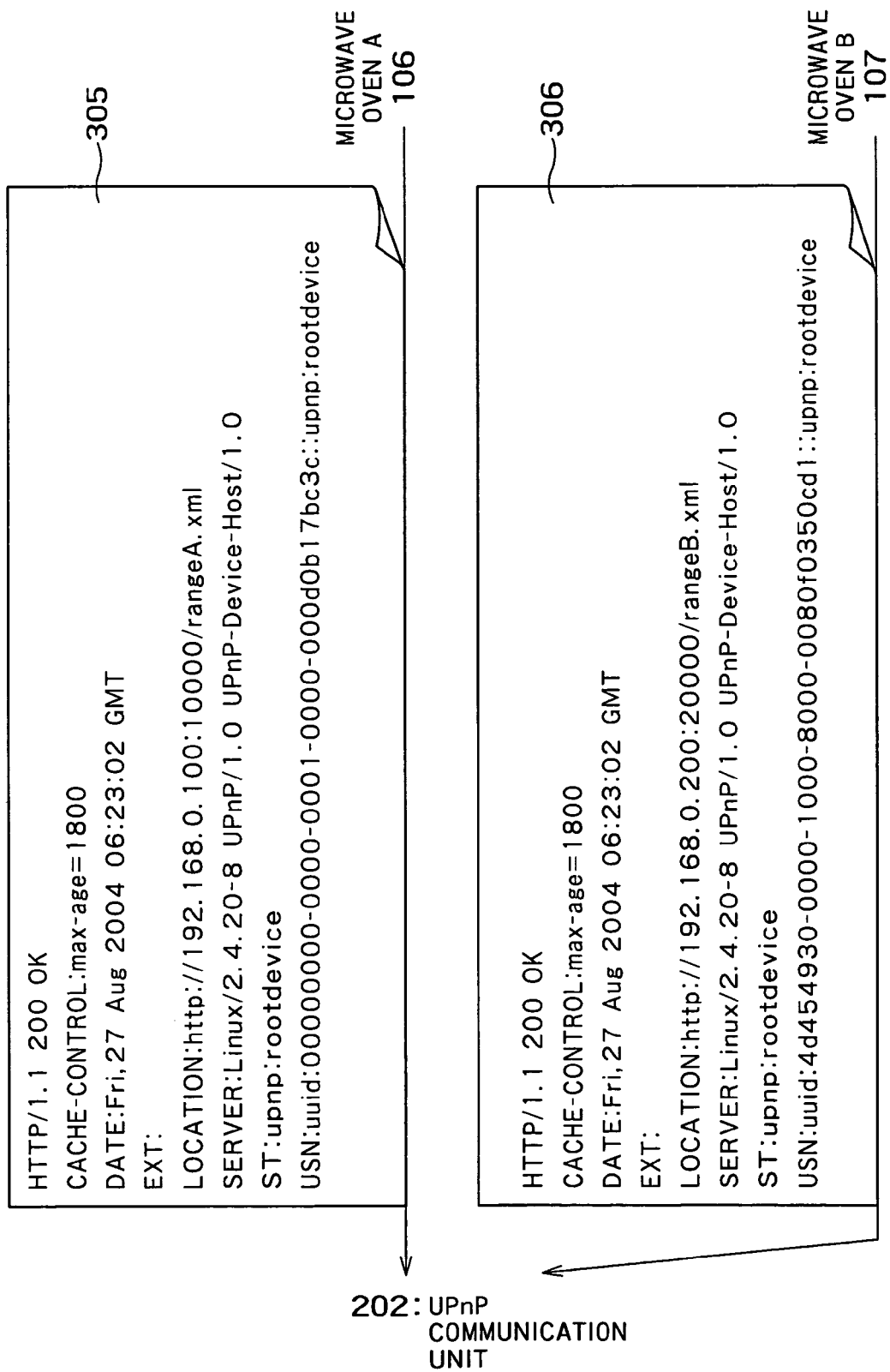
FIG. 6 is a diagram showing an example of search response by UPnP in the first embodiment.

FIG. 6 is a diagram showing an example of the search responses 305 and 306 which are returned by the device which receives the search request 304 and is compatible with UPnP. In the digital television 104 in the embodiment, it is interpreted that a part "LOCATION:http://192.168.0.100:10000/rangeA.xml" in the search response 305 and a part "LOCATION: http://192.168.0.200:20000/rangeB.xml" in the search response 306 are the detected devices compatible with UPnP. This information is stored in "result" of enumPeripherals( ).

More specifically, it can be described in the BML document that enumPeripherals( ) is executed by calling a function search( ) in FIG. 4 to acquire a list of pieces of LOCATION information of devices which can communicates now and are compatible with UPnP. In specification of BML, a unit which acquires an XML document from a designated URL or a unit which analyzes the XML document to extract respective elements are provided as operation functions of XML by DOM. When LOCATION information can be know by using the functions, description described as the XML document is acquired to make it possible to obtain detailed information such as a device name or the like of a detected device by analyzing the description.

In this manner, in digital broadcasting which delivers control signals for the devices, a device/service detecting method which is common in devices connected in a network installed in each house can be provided.

SECOND EMBODIMENT

This embodiment is an example in which a digital television 104 which receives a BML document 700 delivered from a broadcasting station 100 transmits a control instruction to a device compatible with UPnP on a home network 105.

An example of a device control system according to the present invention will be described below with reference to the accompanying drawings.

FIG. 1 is a diagram showing an example of a device control system according to the embodiment. FIG. 2 is also a diagram showing an example of a block diagram of the digital television 104 in the embodiment. The second embodiment is different from the first embodiment in that a BML processing unit 201 uses getArrayFromPeripheral( ) defined by BML as an external device control function. Since the other points in the second embodiment are the same as those in the first embodiment, an explanation thereof will be omitted.

Figure 7:
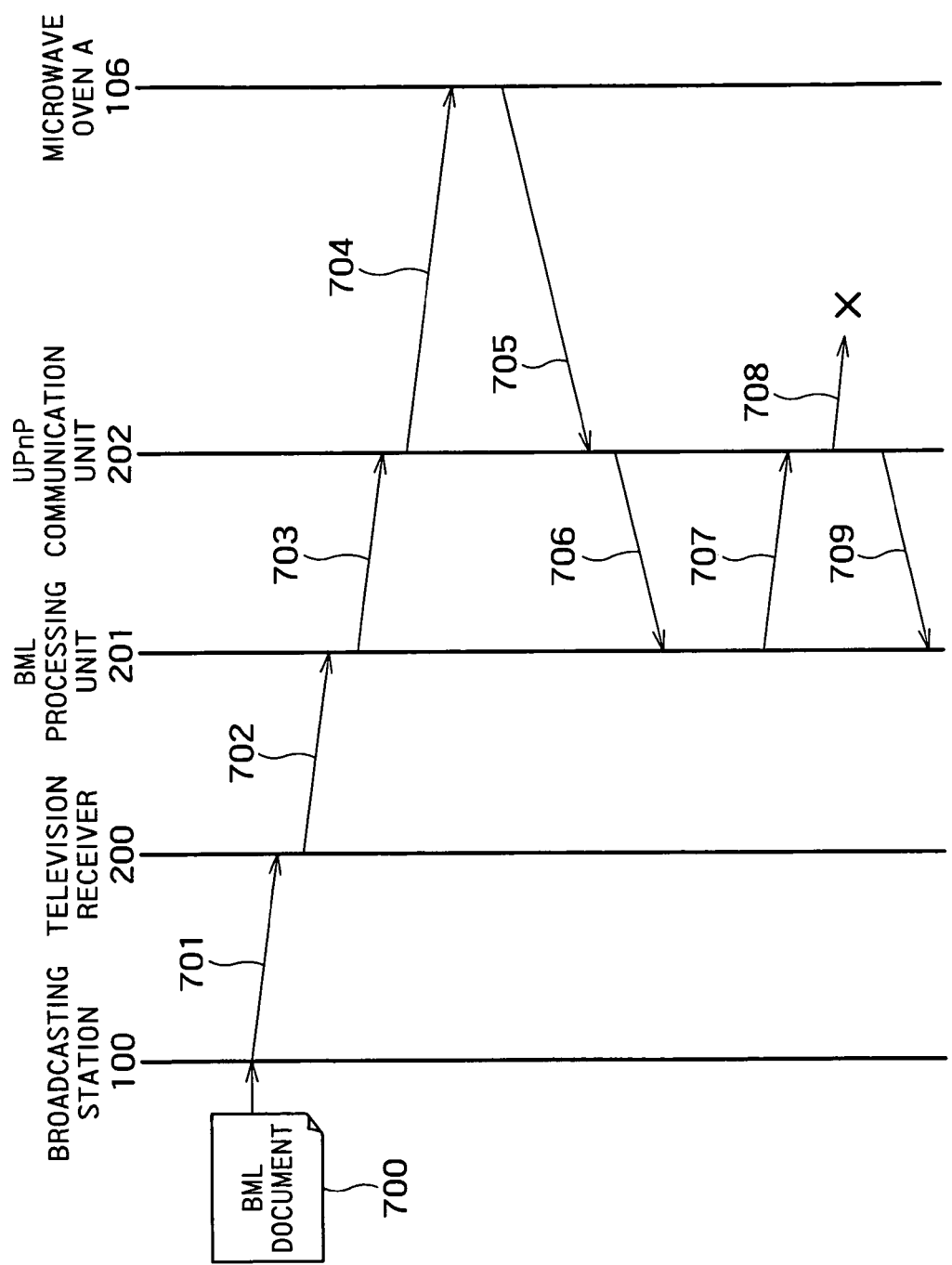
FIG. 7 is a diagram showing an example of a flow chart for controlling a device by a device control system according to a second embodiment.

FIG. 7 shows an example of a flow chart for controlling a device by a device control system according to the embodiment.

First, a BML document 700 including an external device control function (getArrayFromPeripheral( )) is delivered from the broadcasting station 100 as a broadcast wave 701. When the digital television 104 receives the broadcast wave 701, a television receiver 200 separates the BML document 700 from the broadcast wave 701 to give the BML document 700 to a BML processing unit 201 as BML document information 702.

The BML processing unit 201 displays a screen depending on a tag described in the received BML document information 702 and executes ECMAScript. When the external device control function is described in the BML document information 702, the BML processing unit 201 issues a command 703 depending on the description of the function to a UPnP communication unit 202.

When the UPnP communication unit 202 receives the command 703, the UPnP communication unit 202 creates a control request 704 by SOAP (Simple Object Access Protocol) on the basis of the contents of the command 703 to transmit the control request 704 to the microwave oven A106 to be controlled on the home network 105.

The microwave oven A106 compatible with UPnP transmits a control response 705 including a result or the like of a control request of the control request 704. The UPnP communication unit 202 which receives the control response 705 returns the received information to the BML processing unit 201 as an execution result 706 of the external device control function (getArrayFromPeripheral( )).

The SOAP mentioned here is a control mechanism defined by UPnP and a specification to execute RPC (Remote Procedure Call) in a distributed environment. In the SOAP, HTTP (Hyper Text Transfer Protocol) is used in communication and a character string of an XML form is used as an argument.

The details of information transmitted and received in the flow will be described in more detail.

In the embodiment, an input/output specification of the external device control function (getArrayFromPeripheral( )) is defined as follows in the embodiment.

Function: Control message is transmitted and received to and from device compatible with UPnP Syntax: Array getArrayFromPeripheral(
    input String controlURL,
    input String method,
    input Number timeout
    [,inout Array data]
)

Argument:

controlURL URL in UPnP which specifies an IP address, a port number, and a service, of controlled object
    method      action name
    timeout     designation of time assumed as time out (millimeter second)
        data[0]     service type
        data [i],data[i+1](i>=1)      name of argument and
                                        value     of
argument
        Return value: Array[0]numerical   value   expressing
result code
            1 success
            −1 failure in connection to device to be controlled
            −2 unsupported method is given
            −3 time out occurs
            400 or more     errorCode    to
Control of UPnP
            NaN         failure caused by other factor
            Array[1]character string of XML form of
Body section of response message Explanation: Control by SOAP is performed to an URL designated by an argument controlURL by using a service type, an action name, and the name and value of the argument. The return value is an array, and a control result is stored in the first element of the array, and the content of a response message is stored in the next element of the array.

Figure 8:
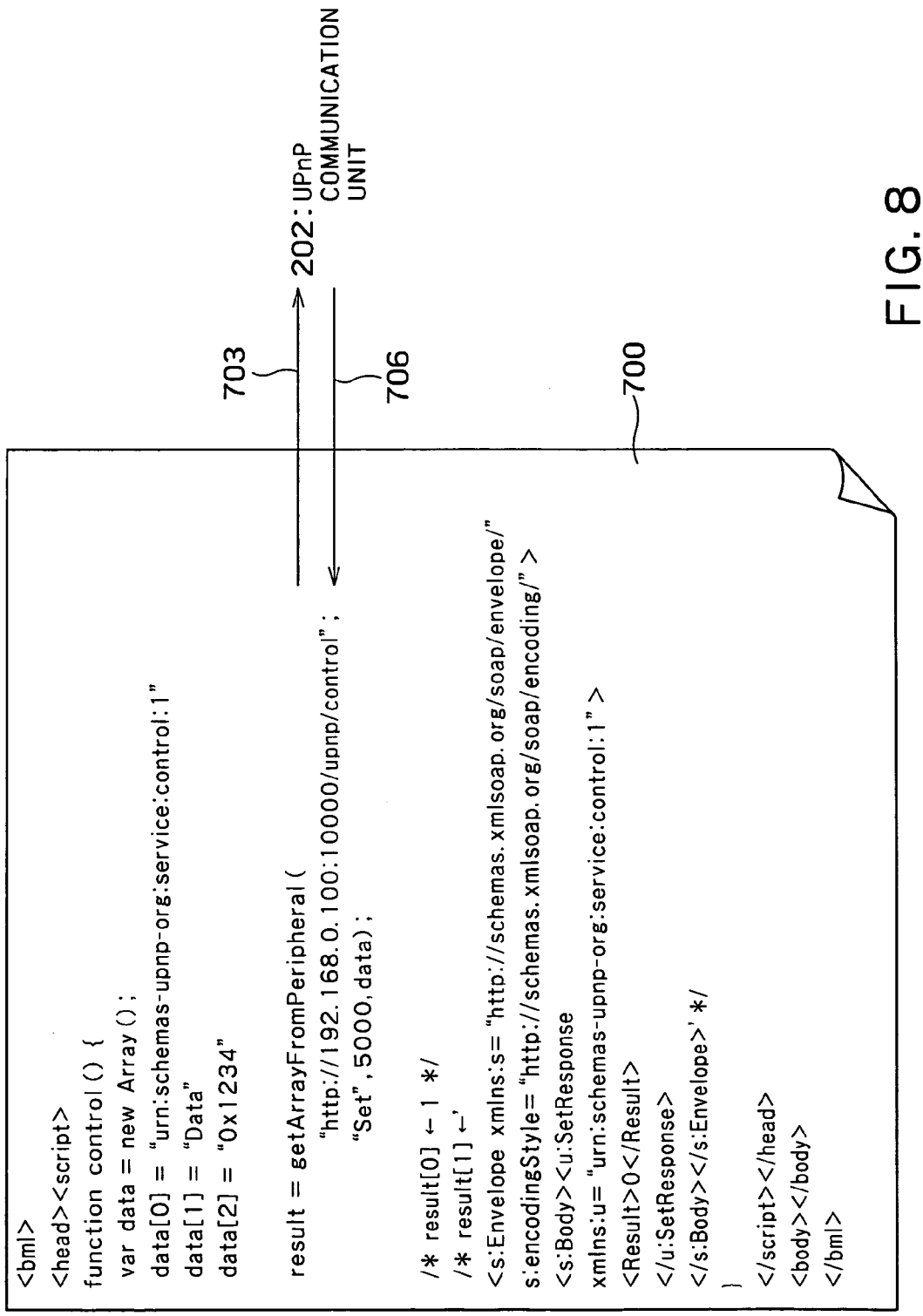
FIG. 8 is a diagram showing an example of a BML document in the second embodiment.

FIG. 8 is a diagram showing an example of the BML document 700 to control a device by the device control system according to the embodiment. In an actual BML document, an xml declaration, a DTD declaration, a bml declaration, designation of a style sheet, and the like are necessary. However, the declarations, the designation, and the like are omitted for descriptive convenience. An example of a value supposed as a return value of the execution result of getArrayFromPeripheral( ) is described in the form of a comment text by using symbols /* ... */. As a matter of course, the comment text does not influence the execution of the script at all, and does not need to be described in an actual BML document.

The BML processing unit 201 interprets the description ("http://192.168.0.100:10000/upnp/control" or the like) of the argument of getArrayFromPeripheral( ) of the BML document 700 to issue the command 703 to the UPnP communication unit 202. The BML processing unit 201 receives an execution result 706 serving as a response from the UPnP communication unit 202 to the command 703 to store the result in "result". In this case, it is assumed that a device to be controlled has an IP address 192.168.0.100 and a port number 10000.

Figure 9:
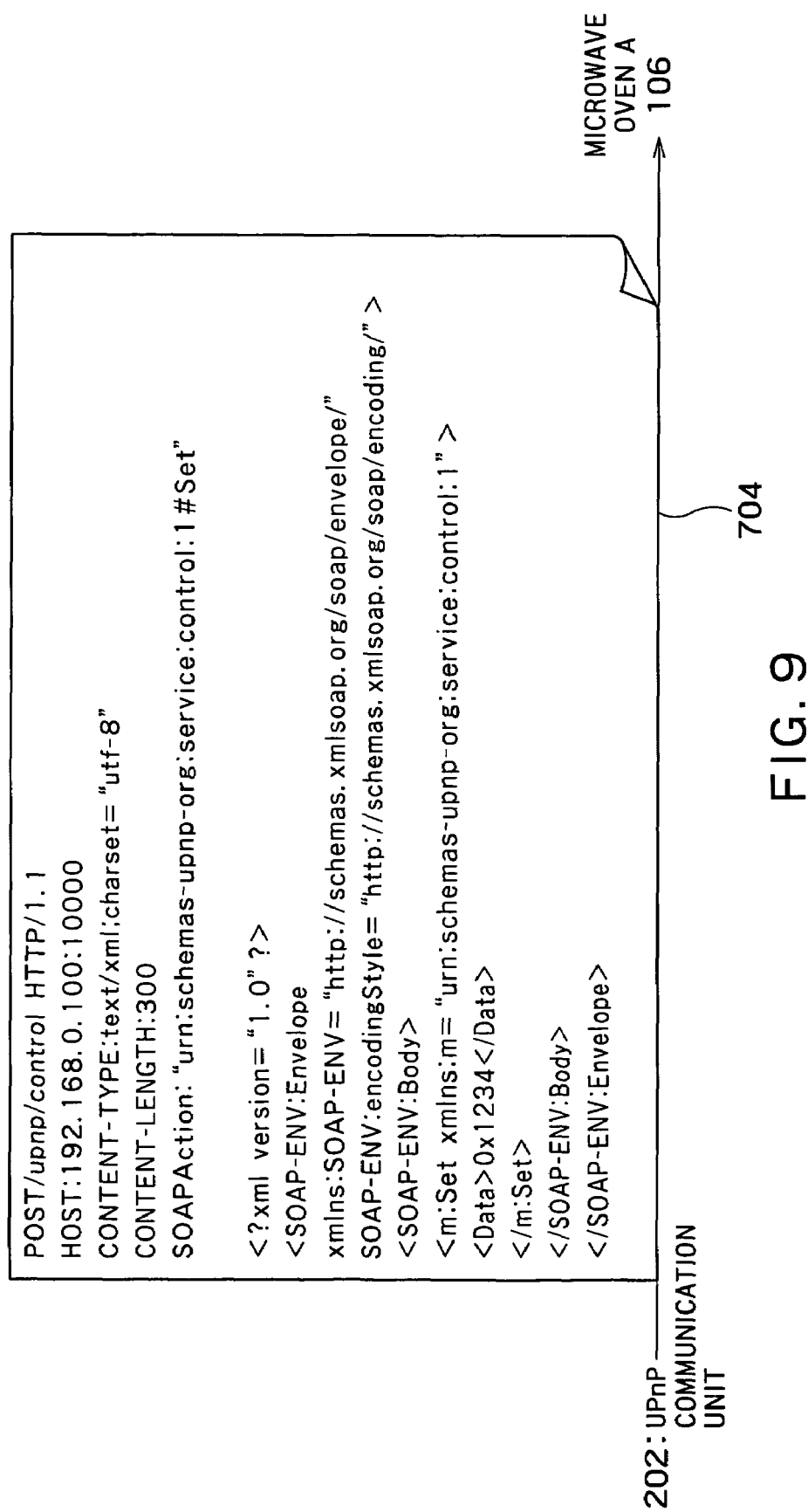
FIG. 9 is a diagram showing an example of control request by UPnP in the second embodiment.

FIG. 9 is a diagram showing an example of the control request 704 transmitted by the UPnP communication unit 202 which receives the command 703. In the embodiment, in communication from the UPnP communication unit 202 to the microwave oven A106, a control request message (control request) is created by method: POST of HTTP to transmit the control request message. A section "http://192.168.0.100:10000/upnp/control" shown in FIG. 8 corresponds to "POST/upnp/control" of the first row and a HOST header "HOST: 192.168.0100:10000" of the second row. The content of data [0] and an argument "Set" of getArrayFromPeripheral( ) shown in FIG. 8 correspond to a service type "urn:schemas-upnp-org:service:control:1" of the fourth row and an action name "Set" of the fourth row, respectively. These values are also reflected on "<m:Set m="urn:schemas-upnp-org:service:control:1">" of a message Body section (<SOAP-ENV:Body>). Furthermore, the name and value of the argument shown in FIG. 8, i.e., the contents of data[1] and data[2] are expressed like "<Data>0x1234</Data>" described in the message Body section. When a combination of arguments, e.g., data[i] and data[i+1] is further designated in the BML document 700 in FIG. 8, tag combinations the number of which is equal to the number of control requests in creation of the control request 704 is generated.

Figure 10:
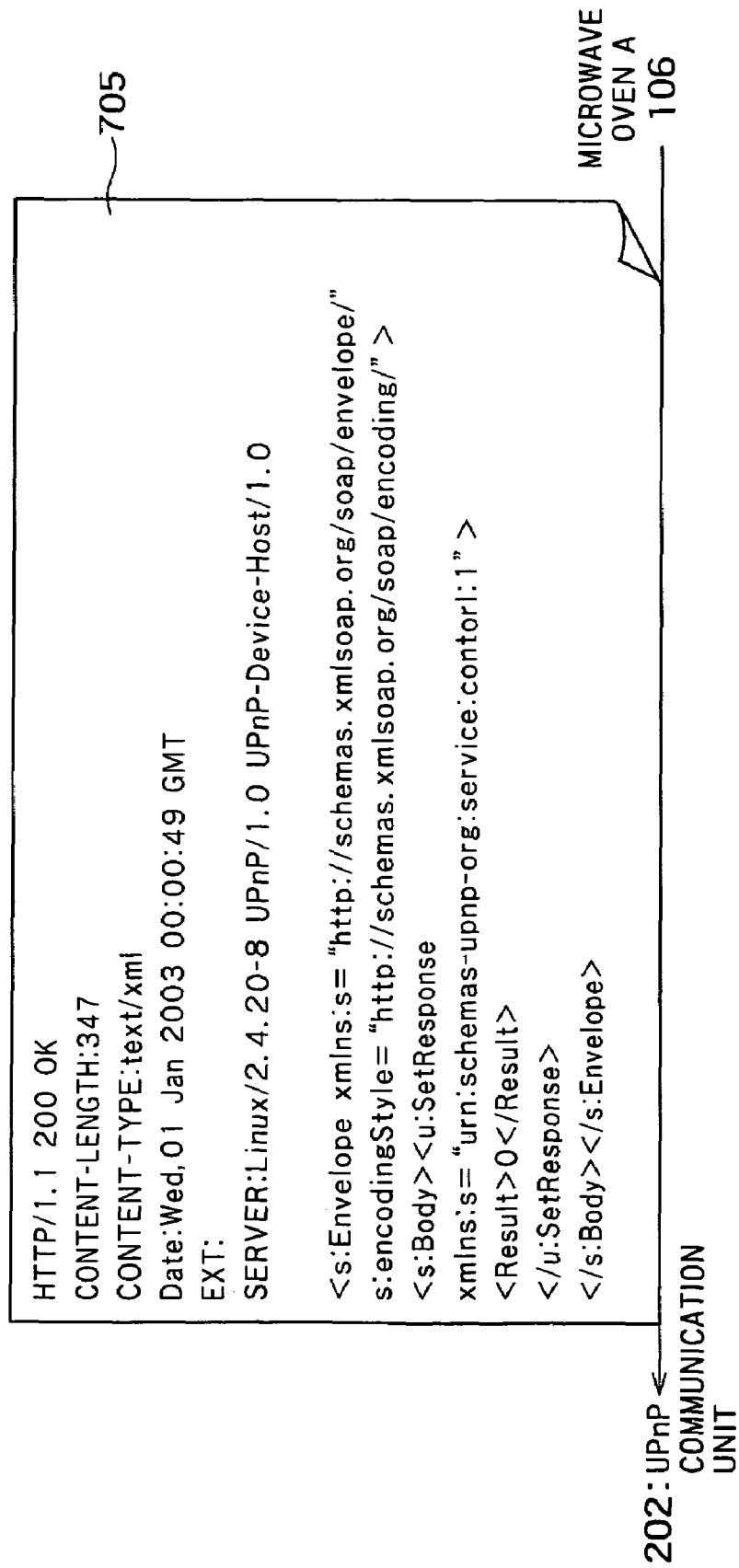
FIG. 10 is a diagram showing an example of control response by UPnP in the second embodiment.

FIG. 10 is a diagram showing an example of the control response 705 which is returned by a device which receives the control request 704 and is compatible with UPnP. In the digital television 104 according to the embodiment, a section "<s: Envelope . . . > . . . </s:Envelope>" is handled as a return value of getArrayFromPeripheral( ). More specifically, when the execution result 706 shown in the control response 705 in FIG. 10 is obtained, the BML processing unit 201 stores "1" in result[0] show in FIG. 8 and stores a character string of an XML form, i.e., "<s:Envelope . . . > . . . </s:Envelope>" of the control response 705 in result[1].

Figure 11:
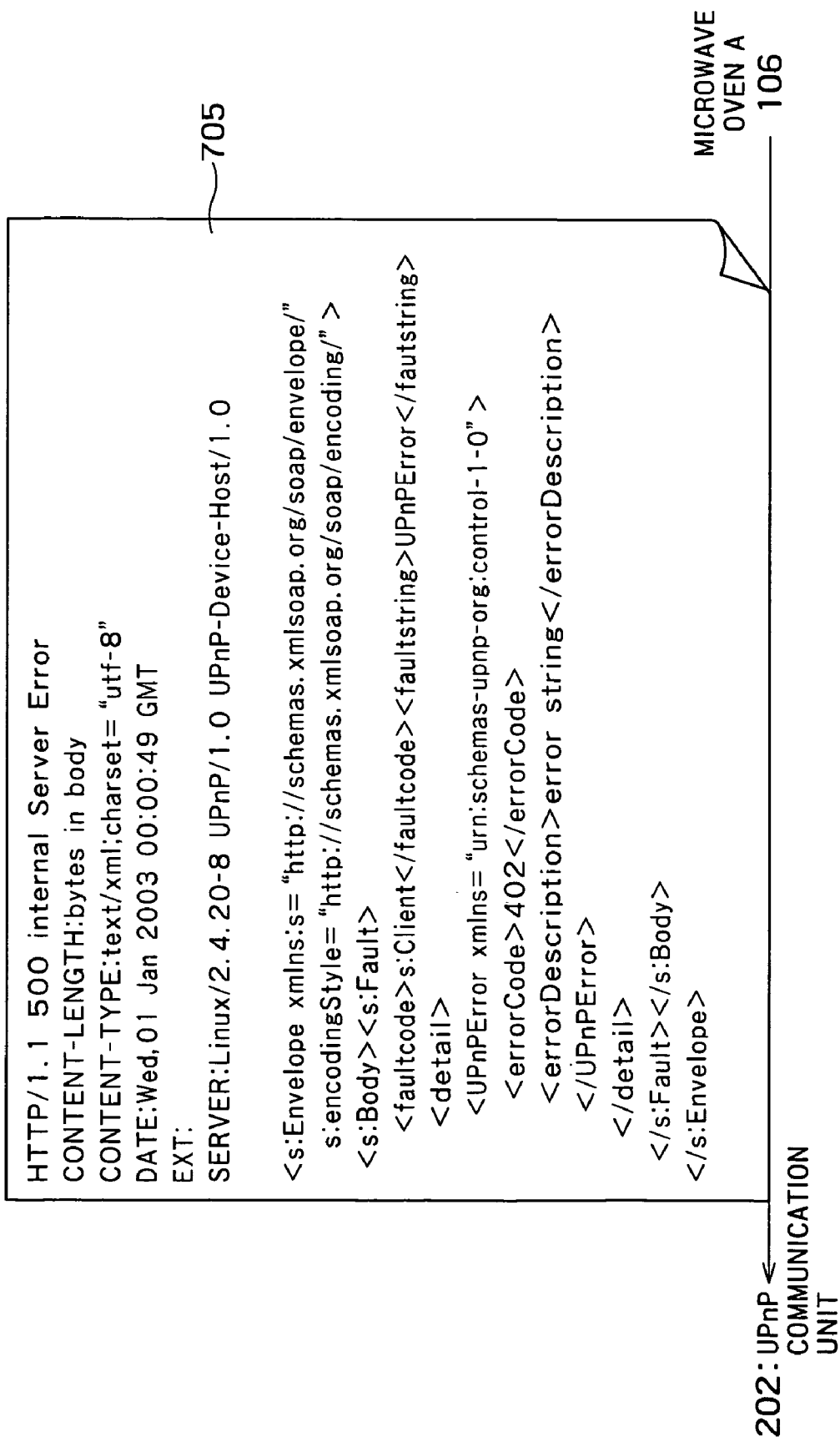
FIG. 11 is a diagram showing another example of control response by UPnP in the second embodiment.

When the control requested by the control request 704 is not normally completed in the microwave oven A106, the control response 705 as shown in FIG. 11 is returned in UPnP. In this case, a section "<errorCode>402</errorCode>" described in the control response 705 is analyzed, and a value "402" serving as an error code is stored in result[0] shown in FIG. 8.

As in a control request 708 shown in FIG. 7, when communication itself with the microwave oven A106 to be controlled is failed, the UPnP communication unit 202 returns an error code "−1" as a execution result 709 to store "−1" in result[0] shown in FIG. 8. Even though the communication is successful, when there is no response within set time due to time out, it is also determined that the communication is failed.

More specifically, a function control( ) in FIG. 8 is called to execute getArrayFromPeripheral( ), and a control message is transmitted to a device to be controlled by UPnP. The result can be obtained as a character string of an XML form. When a state of a device is to be acquired, an XML-form character string as the return value is analyzed by an XML operation function of DOM of the BML document to make it possible to check the state of the device.

In processes of transmitting a control message to a device by UPnP and receiving a response message, there are two schemes, i.e., Action (mainly used for control) and Query for variable (mainly used to acquire a state). Since the communication procedure of Action is the same as that of Query for variable, the embodiment explains that UPnP communication corresponding to getArrayFromPeripheral( ) in the BML document is performed by the scheme of Action. However, the present invention can easily cope with the scheme of Query for variable.

In this manner, in digital broadcasting which delivers control signals for the devices, a control method which is common in devices connected in a network installed in each house is provided.

THIRD EMBODIMENT

This embodiment is an example in which a digital television 104 which receives a BML document 1200 delivered from a broadcasting station 100 transmits a control instruction to a device compatible with UPnP on a home network 105, and upon completion of the control instruction, the digital television 104 is notified of the completion of the control instruction.

An example of a device control system according to the present invention will be described below with reference to the accompanying drawings.

FIG. 1 is a diagram showing an example of a device control system according to the embodiment. FIG. 2 is a diagram showing an example of a block diagram of the digital television 104 in the embodiment. The third embodiment is different from the second embodiment in that GENA (Generic Event Notification Architecture) serving as a notification mechanism using UPnP in the UPnP communication unit 202 and an extended mechanism to handle an interruption event using BML in the BML processing unit 201 are used in cooperation with each other. Since the other points are the same as those in the first embodiment, a description thereof will be omitted.

GENA mentioned here defines a method of notifying that a service state of a device is changed and is defined on UPnP.

In GENA, a subscriber (device at a destination for notifying the change of the state) transmits a request message including a notification destination, a service object to be notified, or the like to a publisher (device having a service the state of which changes) by a SUBSCRIBE method. The notification request has an expiration date. When the subscriber wants to continuously receive notification after the expiration date, the subscriber must periodically repeat the notification request.

Thereafter, when there is a change in state to be notified on the publisher side, the publisher transmits an event message to the subscriber to notify that the state of the service is changed by a NOTIFY method.

In the notification request, as arguments of the notification request, the IP address of the publisher, a port number of the publisher, a path name which specify a service to be notified by the publisher, and a URL of the subscriber itself which receives an event message are necessary. SID (Service Identifier) is provided as a return value from the publisher side to the notification request. In the notification request when the subscriber wants to continuously receive notification, as arguments of the notification request, the SID is necessary.

Figure 12:
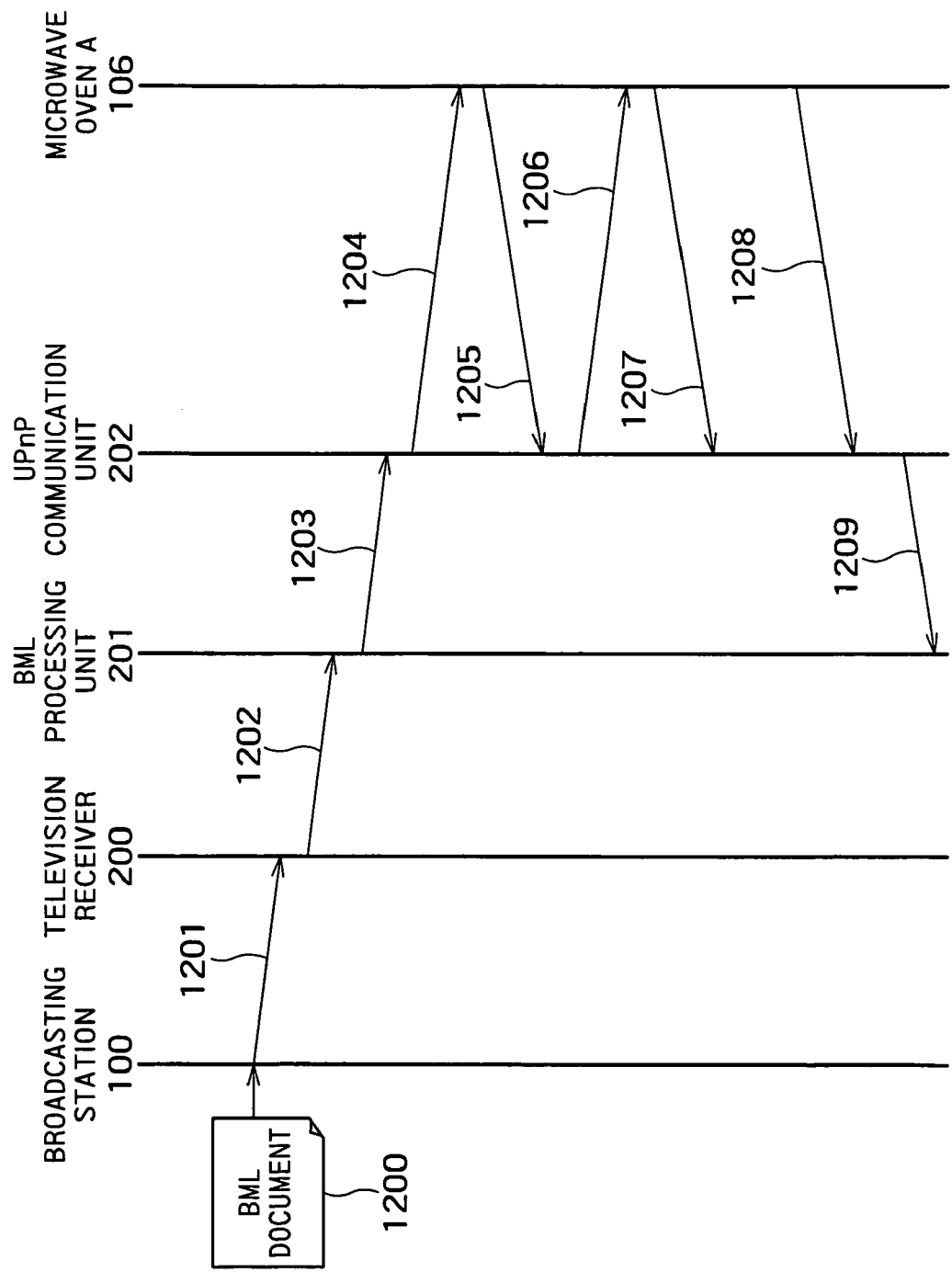
FIG. 12 is a diagram showing an example of a flow chart to control a device by a device control system according to a third embodiment and to receive a notification of completion.

FIG. 12 shows an example of a flow chart to control a device by the device control system according to the embodiment and to receive a notification of completion.

First, a BML document 1200 including "<beitem type="PeripheralEventOccurred" . . . >" is delivered from the broadcasting station 100 as a broadcast wave 1201. When the digital television 104 receives the broadcast wave 1201, a television receiver 200 separates the BML document 1200 from the broadcast wave 1201 to give the BML document 1200 to a BML processing unit 201 as BML document information 1202.

The BML processing unit 201 displays a screen depending on a tag described in the received BML document information 1202 and executes ECMAScript. When "<beitem type="PeripheralEventOccurred" . . . >" targeting at a device compatible with UPnP is described in the BML document information 1202, the BML processing unit 201 issues a command 1203 depending on the description of the function to a UPnP communication unit 202.

When the UPnP communication unit 202 receives the command 1203, the UPnP communication unit 202 creates a subscribe request 1204 by GENA on the basis of the command 1203 to transmit the subscribe request 1204 to the microwave oven A106 to be controlled on the home network 105.

The microwave oven A106 compatible with UPnP transmits a control response 1205 including a result or the like of a control request of the subscribe request 1204. The UPnP communication unit 202 which receives the control response 1205 repeatedly transmits a subscribe request 1206 at such a frequency that the valid term is not expired unless a process that the BML processing unit 201 is ended, a page of the BML document 1200 changes into another page, or a notification request is explicitly canceled in the BML document is performed.

When the microwave oven A106 is requested to notify completion of cooking, an event message 1208 is transmitted from the microwave oven A106 to the digital television 104 when the microwave oven A106 completes the cooking. When the UPnP communication unit 202 receives the event message 1208, the UPnP communication unit 202 returns the content of the event message 1208 to the BML processing unit 201 as an execution result 1209.

The details of information transmitted and received in the flow will be described in more detail.

In the embodiment, a specification used when "PeripheralEventOccurred" is designated to a value of type attribute of a beitem element defined by BML is defined as follows.

beitem element: Attribute of beitem element is defined as follows for UPnP notification mechanism id attribute (necessary) identifier of beitem element onoccur attribute (necessary) Character string which specify function name of ECMAScript executed when interruption event occurs is described subscribe attribute (necessary) "subscribe" or "unsubscribe"

type attribute (necessary) Type of interruption event is designated. Here, only "PeripheralEventOccurred" is made valid.

peripheral_ref attribute (necessary) eventSubURL by UPnP is designated for specifying IP address of publisher, port number of the publisher, and service of the publisher.

When a function having a function name specified by an onoccur attribute is called by notification of an event message or failure of a notification request, it is assumed that a function called in the digital television 104 in the embodiment necessarily has Array object as an argument. When the function is called, it is defined that the following value is stored in the content of the argument.

Figure 13:
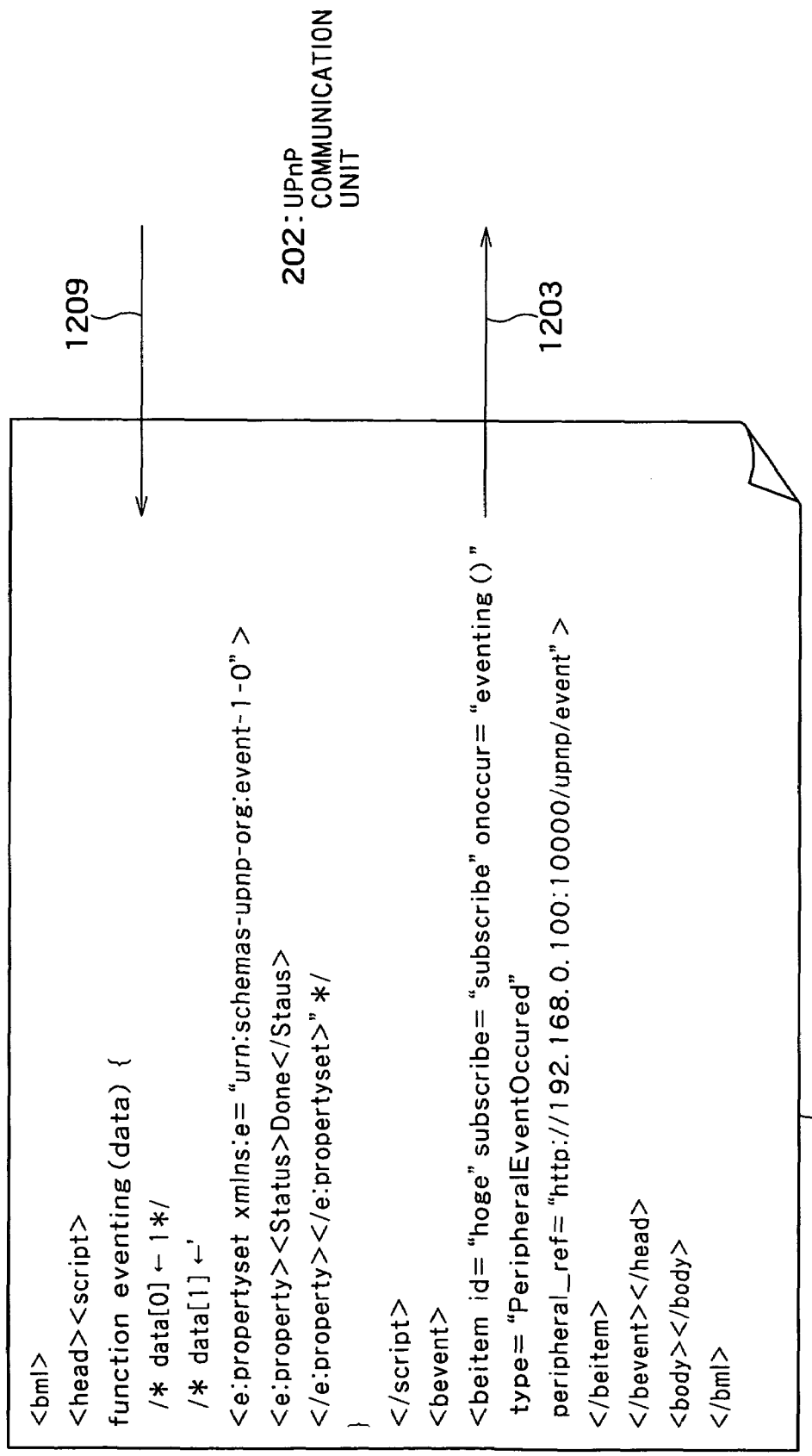
FIG. 13 is a diagram showing an example of a BML document in the third embodiment.

Argument: Array[0] status of function call
1 function call by notification of event message
−1 function call by failure of notification request (failure in communication with device to be controlled)
400 or more function call accompanying failure in notification request (the same as status described in header of subscribe response 1205)
NaN failure caused by other factor
Array[1] character string of XML form described in Body section of event message when the event message is notified FIG. 13 is a diagram showing an example of the BML document 1200 to control a device by the device control system according to the embodiment and to receive a notification of completion. In an actual BML document, an xml declaration, a DTD declaration, a bml declaration, designation of a style sheet, and the like are necessary. However, the declarations, the designation, and the like are omitted for descriptive convenience. An example of a value supposed as a return value of the execution result of a function eventing( ) is described in the form of a comment text by using symbols /* . . . */. As a matter of course, the comment text does not influence the execution of the script at all, and does not need to be described in an actual BML document.

As a value of a function given to the onoccur attribute of beitem element in the BML document 1200, a character string "eventing( )" to specify a function is designated. As ECMAScript function in a script element, eventing(data) having an argument of Array object is defined.

It is assumed that, as the value given to the onoccur attribute, only a function name such as "eventing( )" is consistently designated without designating an argument or the like.

The BML processing unit 201 can obtain an IP address 192.168.0.100 of the microwave oven A106 to be controlled and a port number 10000 on the basis of "http://192.168.0.100:10000/upnp/event" (corresponding to eventSubURL) designated as a value of a peripheral_ref attribute of the BML document 1200. The information is transmitted to the UPnP communication unit 202 as a command 1203 and used in communication with the microwave oven A106.

Figure 14:
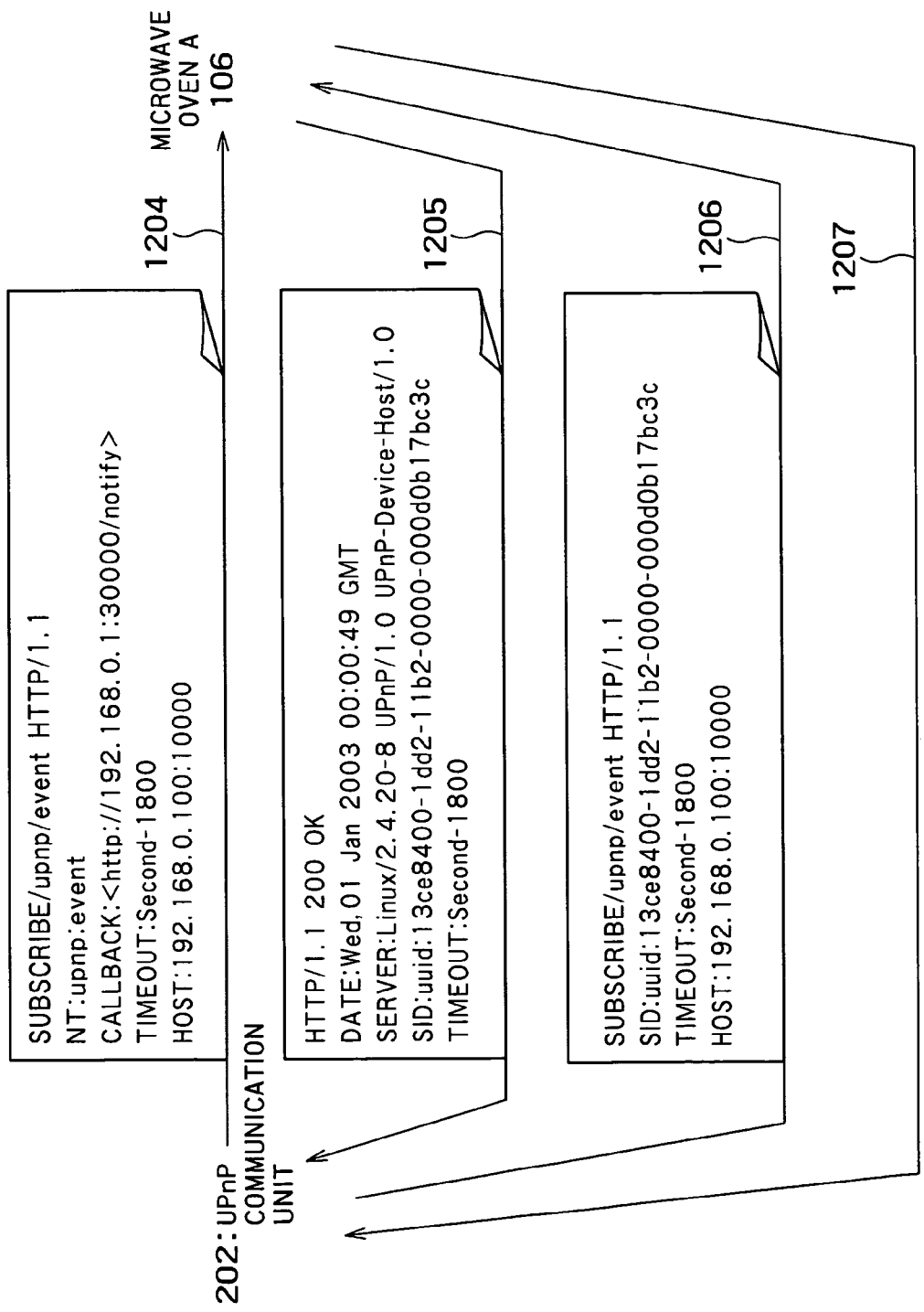
FIG. 14 is a diagram showing an example of subscribe request and subscribe response by UPnP in the third embodiment.

FIG. 14 is a diagram showing an example of messages 1204, 1205, and 1206 transmitted and received by the UPnP communication unit 202 which receives the command 1203. A section "peripheral_ref="http://192.169.0.100:10000/upnp/event"" shown in FIG. 13 corresponds "/upnp/event" of "SUBSCRIBE /upnp/event HTTP/1.1" of the first row and HOST header "HOST:192.168.0.100:10000" of the fifth row in FIG. 14. As the other values, i.e., a fixed character string NT, CALLBACK representing a URL of a calling destination in the digital television 104 which receives a notification, TIMEOUT (1800 seconds in FIG. 14) representing an valid term of a notification request, and the like, predetermined values are set by the UPnP communication unit 202.

When the UPnP communication unit 202 receives the subscribe response 1205 representing that processing can be normally completed from the microwave oven A106, a value "uuid:13ce8400-1dd2-0000-000d0b17bc3c" of SID header described in the fourth row of the subscribe response 1205 is stored. Thereafter, even though there is no notification when time-out becomes near, the subscribe request 1206 obtained by changing the sections of NT and CALLBACK of the subscribe request 1204 into the stored SID is created to request the microwave oven A106 to extend the valid term. In this manner, a state in which a notification of completion can be continuously obtained from a device compatible with UPnP can be maintained.

Figure 15:
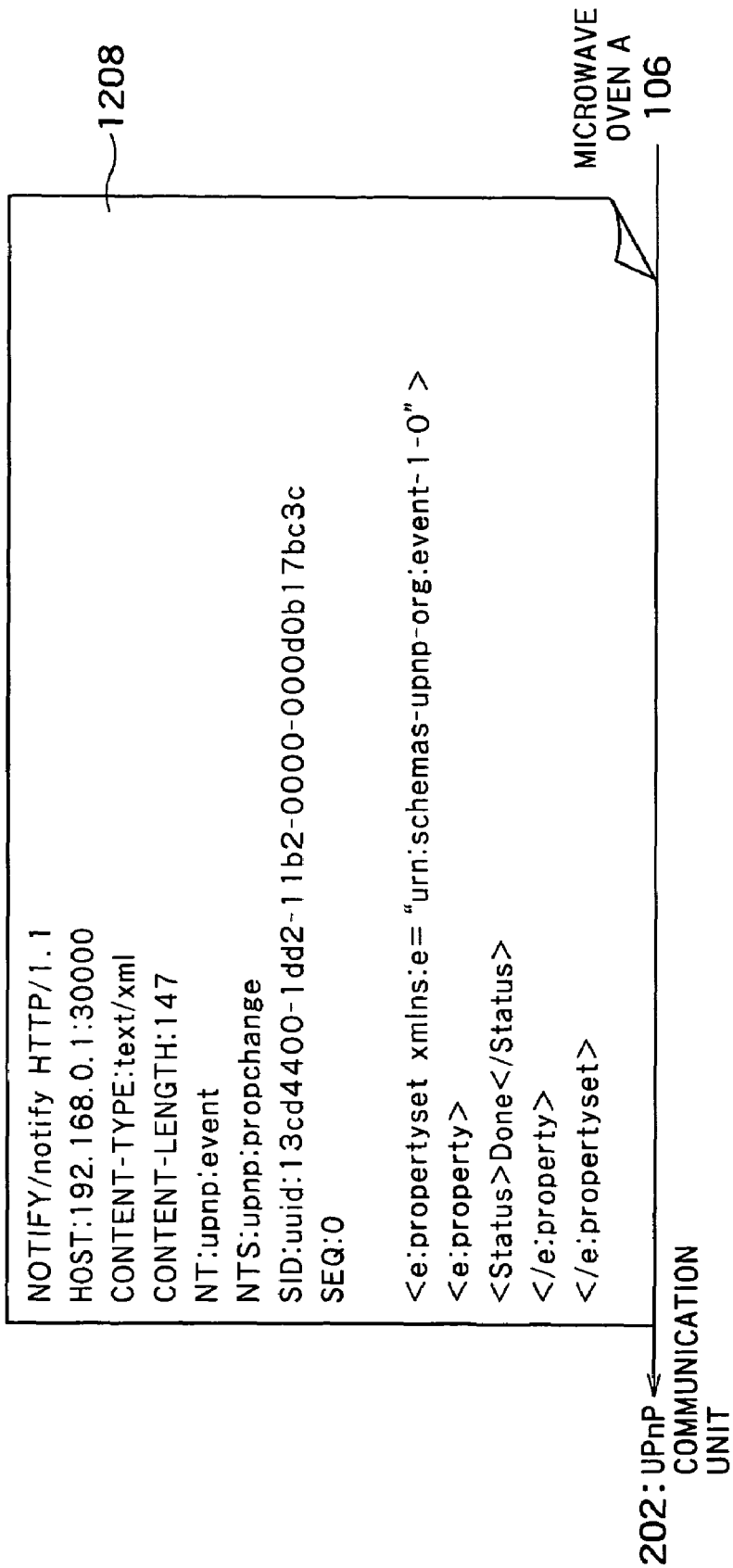
FIG. 15 is a diagram showing an example of an event message by UPnP in the third embodiment.

FIG. 15 shows an example of an event message 1208 transmitted by the microwave oven A106 to the digital television 104 when the change in state requested by the subscribe request 1204 occurs in the microwave oven A106.

In the digital television 104 in the embodiment, a section "<e:propertyset . . . > . . . </e:propertyset>" of the event message 1208 is handled as a return value of eventing( ). More specifically, when the execution result 1209 as shown in the event message 1208 in FIG. 15 is obtained, the BML processing unit 201 stores "1" in result[0] shown in FIG. 13 and stores an XML-form character string "<e:propertyset . . . > . . . </e:propertyset>" of the event message 1208 in result[1]. Thereafter, a function eventing( ) designated by an onoccur attribute is started.

More specifically, a function that completion of a device to be controlled can be known can be described as BML. Also, a function which determines whether a requested control instruction is normally notified in the function eventing( ) in FIG. 13 to obtain the result as a character string of the XML form can be described as BML. When a state of a device is to be acquired, an XML-form character string of a return value is analyzed by an XML operation function of DOM of the BML document to make it possible to check the content of the character string.

Explicit cancel of a notification request is performed by dynamically changing a value of a subscribe attribute of beitem element in the BML document from "subscribe" to "unsubscribe" by the function of ECMAScript. At this time, the UPnP communication unit 202 transmits a message of cancel of a notification request by an UNSUBSCRIBE method to the microwave oven A106.

Figure 16:
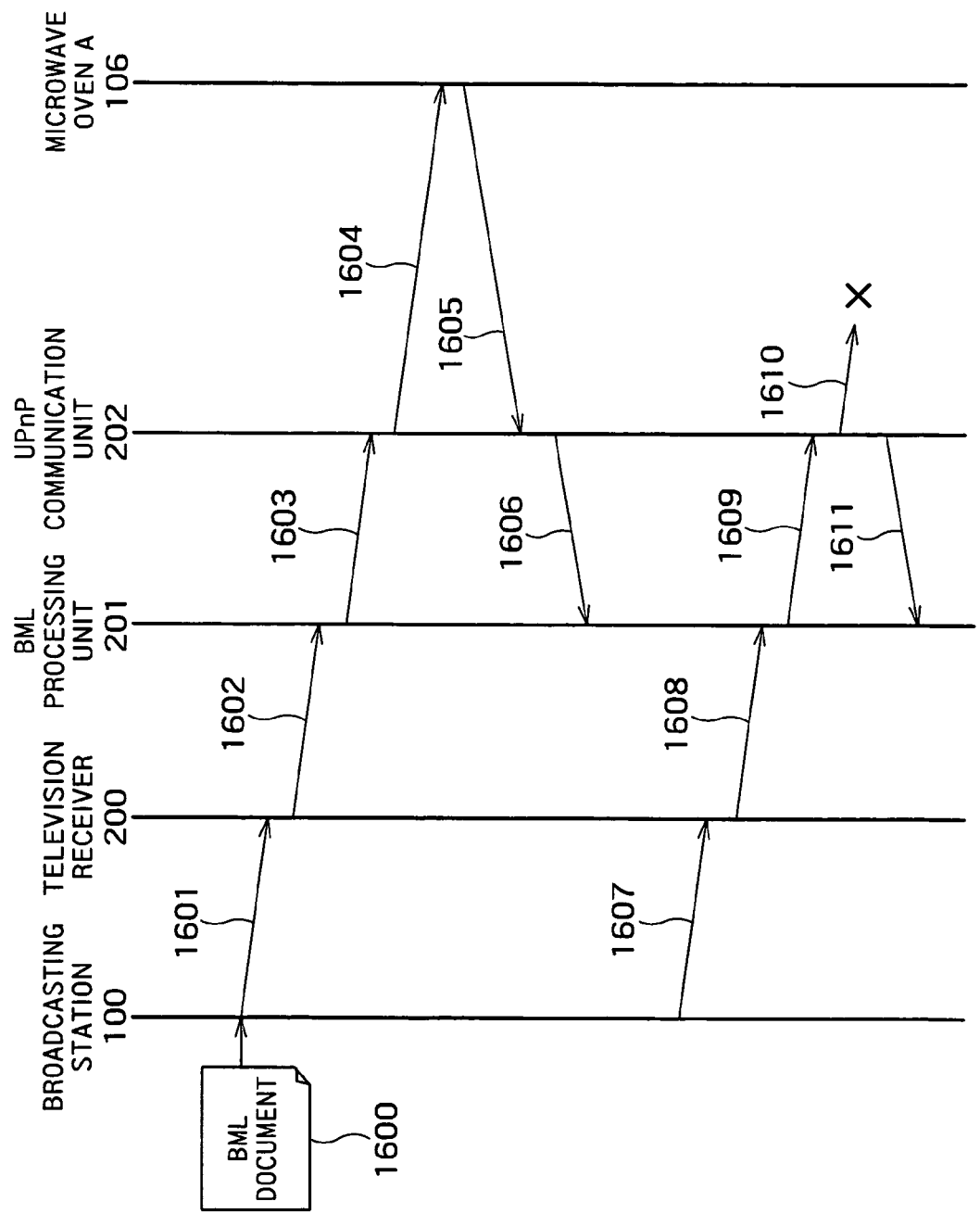
FIG. 16 is a diagram showing another example of a flow chart to control a device by the device control system according to the third embodiment and to receive a notification of completion.
Figure 17:
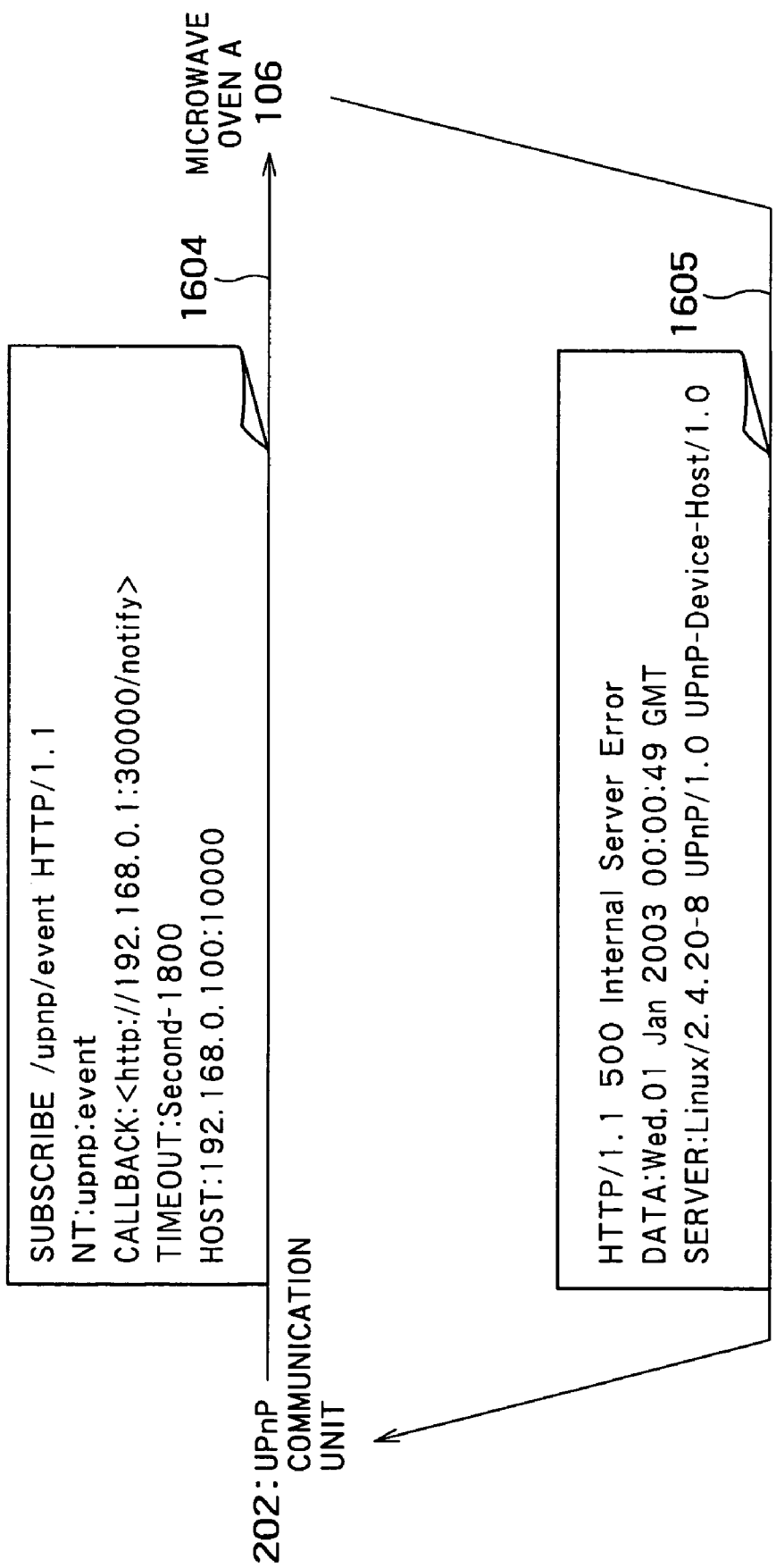
FIG. 17 is a diagram showing another example of subscribe request and subscribe response obtained by UPnP in the third embodiment.

At this time, a case in which subscribe request is not normally completed in the microwave oven A106 will be described. A broadcast wave 1607, BML document information 1608, a command 1609, and a subscribe request 1610 shown in FIG. 16 are the same as those obtained when the subscribe request is normally completed. If the microwave oven A106 detects abnormality in processing of a subscribe request 1601, the microwave oven A106 transmits a subscribe response 1605 as shown in FIG. 17 to notify that the request is error. In this case, an HTTP response code "500" described in the first row of the subscribe response 1605 is stored in data[0] as an error code as shown in FIG. 18.

Figure 18:
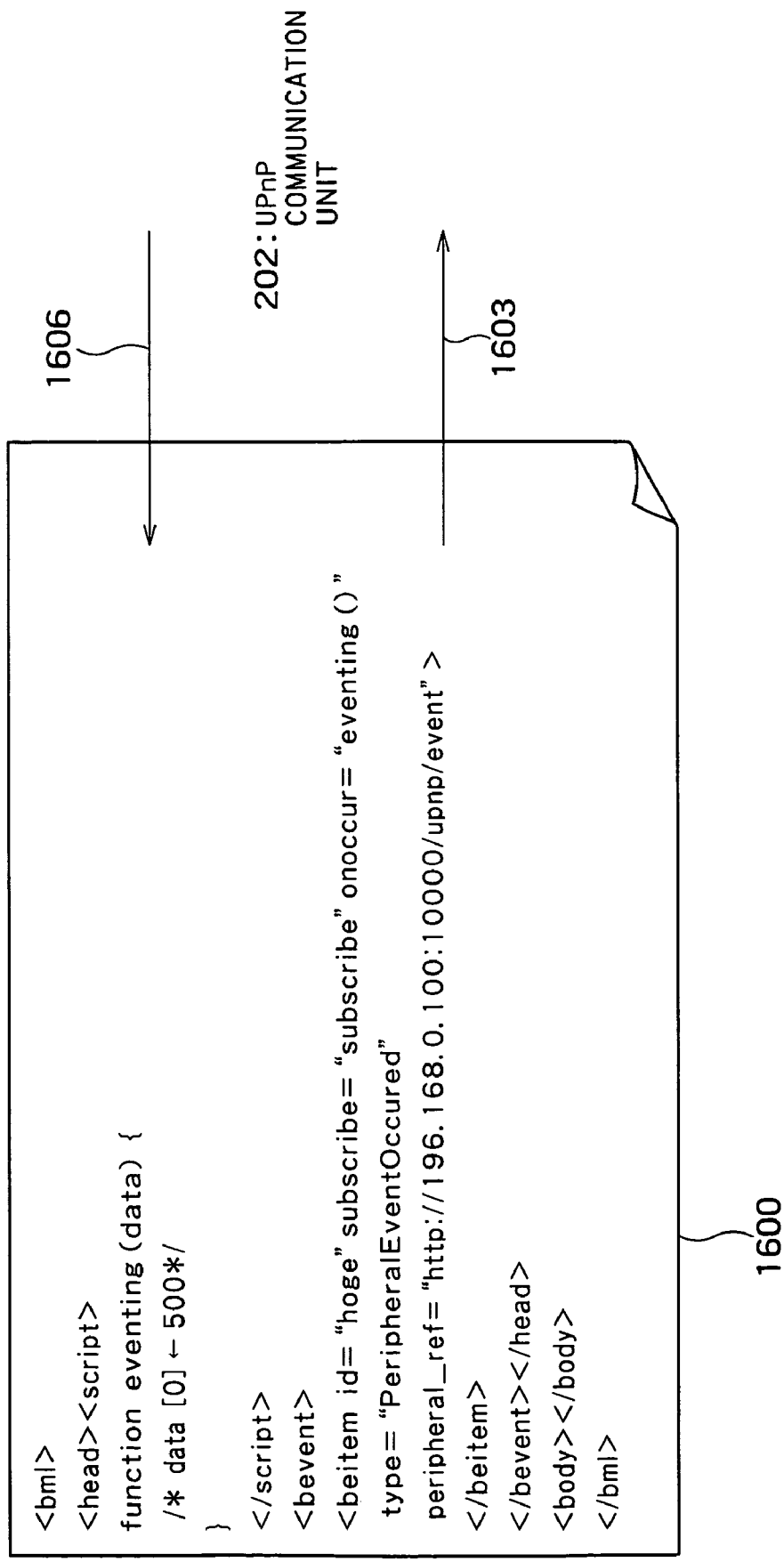
FIG. 18 is a diagram showing another example of a BML document in the third embodiment.

As in the subscribe request 1610 shown in FIG. 16, when communication itself with the microwave oven A106 to be controlled is failed, the UPnP communication unit 202 returns an error code "-1" as an execution result 1611, thereby "-1" is stored in data[0] shown in FIG. 18. Even if the communication with the microwave oven A106 succeeds, when there is no response within set time due to time-out, it is also determined that the communication is failed. Alternatively, not only a point of time of the first notification request at which the BML document is received, but also an error occurring when the subscribe request 1206 is periodically transmitted are determined as described above.

In this manner, in digital broadcasting which delivers control signals for the devices, a control method which is common in devices connected in a network installed in each house is provided.

(Modification by Combination of First to Third Embodiments)

The combination is an example of a device control system obtained by combining the first, second, and third embodiments. Therefore, the system according to the modification has the functions described in the first to third embodiments.

The digital television 104 receives the broadcast wave 102 including a BML document from the broadcasting station 100 prior to control of a device connected to the home network 105. In this modification, it is assumed that Startup.bml which is a start page, rangeA1.bml, rangeA2.bml, rangeA3.bml, and rangeAX.bml which are contents for the microwave oven A106, rangeB1.bml which is contents for the microwave oven B107, and norange.bml which is general contents are delivered.

Figure 19:
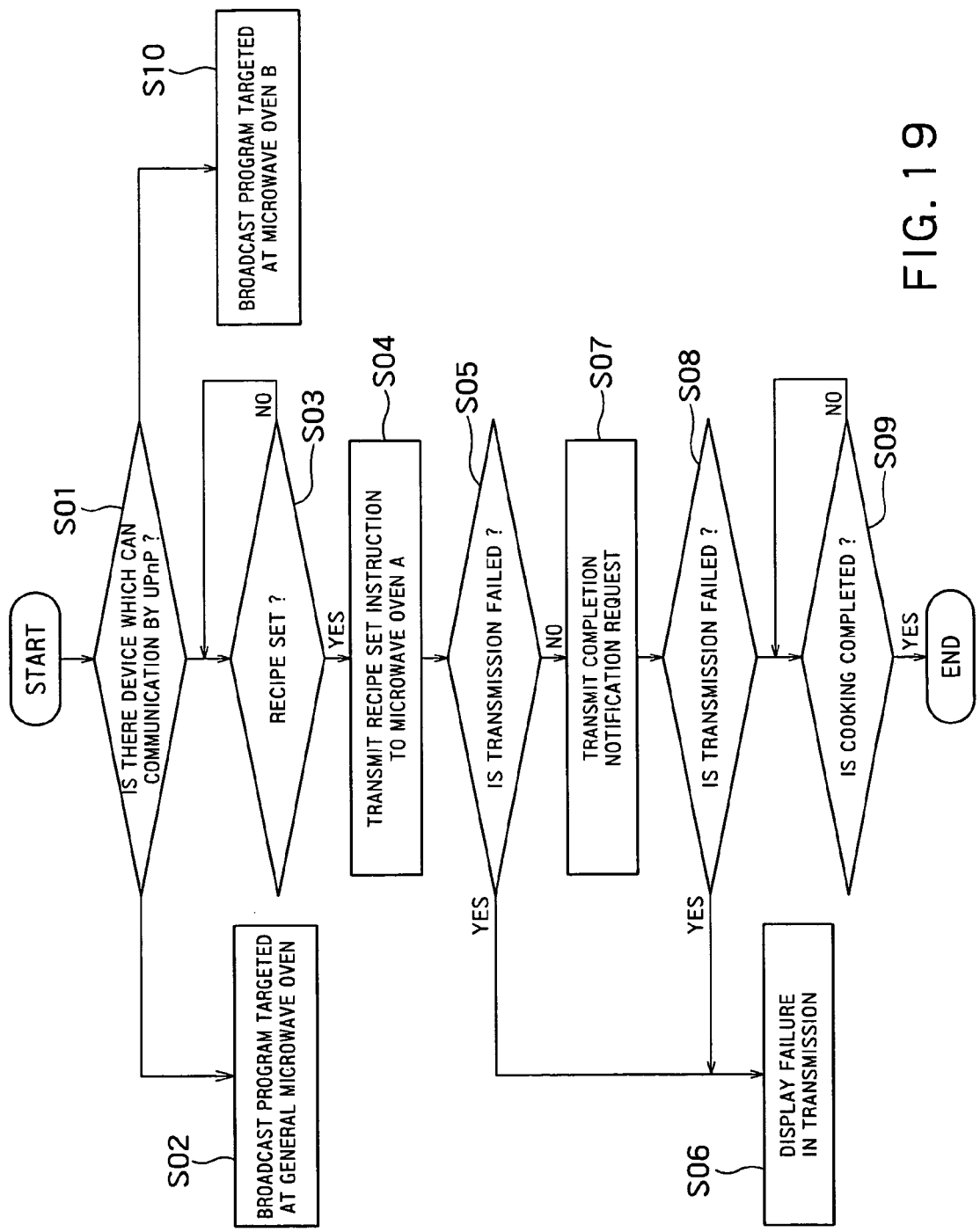
FIG. 19 is a diagram showing an example of a device control flow in a modification of the embodiment.

FIG. 19 is a diagram showing an example of a device control flow in the modification. When the digital television 104 receives a delivered BML document, the BML processing unit 201 begins to interpret Startup.bml which is a start page. In this case, a device compatible with UPnP and connected to the home network 105 is detected, and processing depending on the detected device is performed (step S01). When the microwave oven A106 is detected, the control flow branches to step 503. When the microwave oven B107 is detected, the control flow branches to step S10. When any one of the microwave ovens A106 and B107 is not detected, the control flow branches to step S02.

When the microwave oven A106 is detected, rangeA1.bml is executed to switch a display image on the digital television 104 such that a broadcast program of a menu which can be cooked by the microwave oven A106 is displayed on the digital television 104. At this time, a button representing "set cooking recipe data in microwave oven A" is displayed on the screen of the digital television 104.

When the displayed button is selected and determined by operating a remote controller of the digital television 104 (step S03), recipe data corresponding to a menu in broadcasting is transmitted to the microwave oven A106 through the UPnP communication unit 202 (step S04).

It is determined whether the recipe data is normally transmitted or not (step S05). When it is determined that the transmission is failed, rangeAX.bml to display a message representing "control is failed" on the screen of the digital television 104 is executed (step S06).

When the recipe data can be normally transmitted, a notification request by UPnP for requesting a notification of a cooking completion event of the microwave oven A106 is transmitted (step S07).

It is determined whether a notification request can be normally performed or not (step S08). When it is determined that the notification request is failed, rangeAX.bml to display a message representing "control is failed" on the screen of the digital television 104 is executed (step S06).

The digital television 104 waits until completion of cooking of the microwave oven A106 is notified. When the completion is notified (step S09), rangeA3.bml is executed to display a message representing "cooking is completed" on the screen, and a user is notified of the completion of cooking.

The details of information transmitted and received in the flow will be described in more detail.

Figure 20:
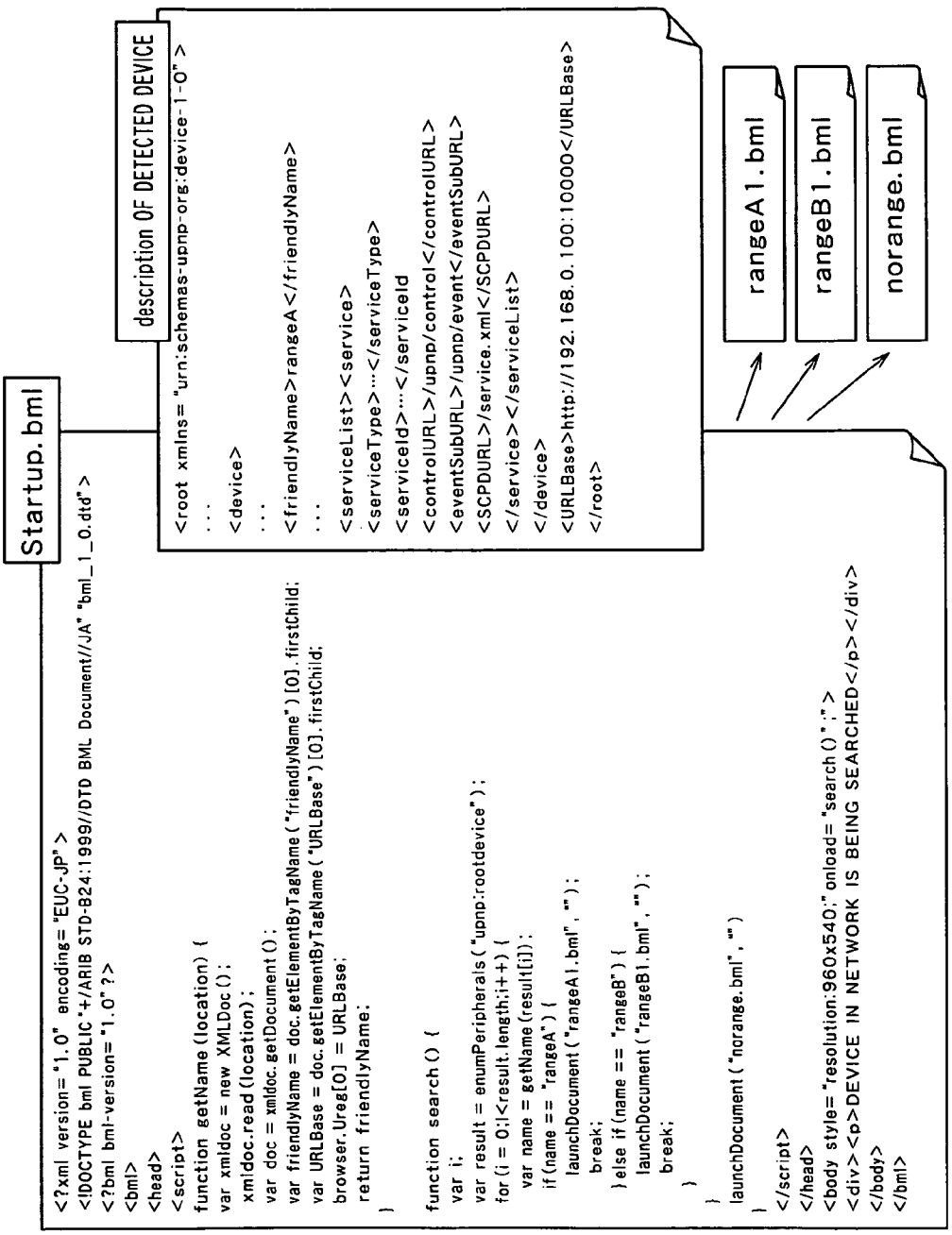
FIG. 20 is a diagram showing an example of a BML document in the modification of the embodiment.

FIG. 20 is a diagram showing a BML document Startup.bml executed first in the device control system according to the modification. In the BML document, a function search( ) is called to perform detection of a device by an external device control function enumperipherals( ) and acquisition of the device name and URLBase of the detected device by a function getName( ). The information of URLBase is information used in generation of controlURL or eventSubURL required for a notification request.

The function search( ) is executed by being designated to onload attribute of body element in reading of Startup.bml. Here, "root:device" is designated as an argument of the external device control function enumperipherals( ) to try to detect all devices which can communicate by UPnP.

The getName( ) is called from the function search( ) for each detected device. From a URL obtained as the return value, a description of an XML document form is acquired by using the DOM function of BML (xmldoc.read(location)). In the description, information like friendlyName element representing a device name and URLBase element representing the IP address, port number, and the like of the device is described. The value of URLBase is stored in a region (Ureg [0]) in which the value can be held even though the BML document changes.

When the value of FriendlyName element is "rangeA", rangeA1.bml is executed by a function launchDocument ( ) which is a function of the BML standard.

Figure 21:
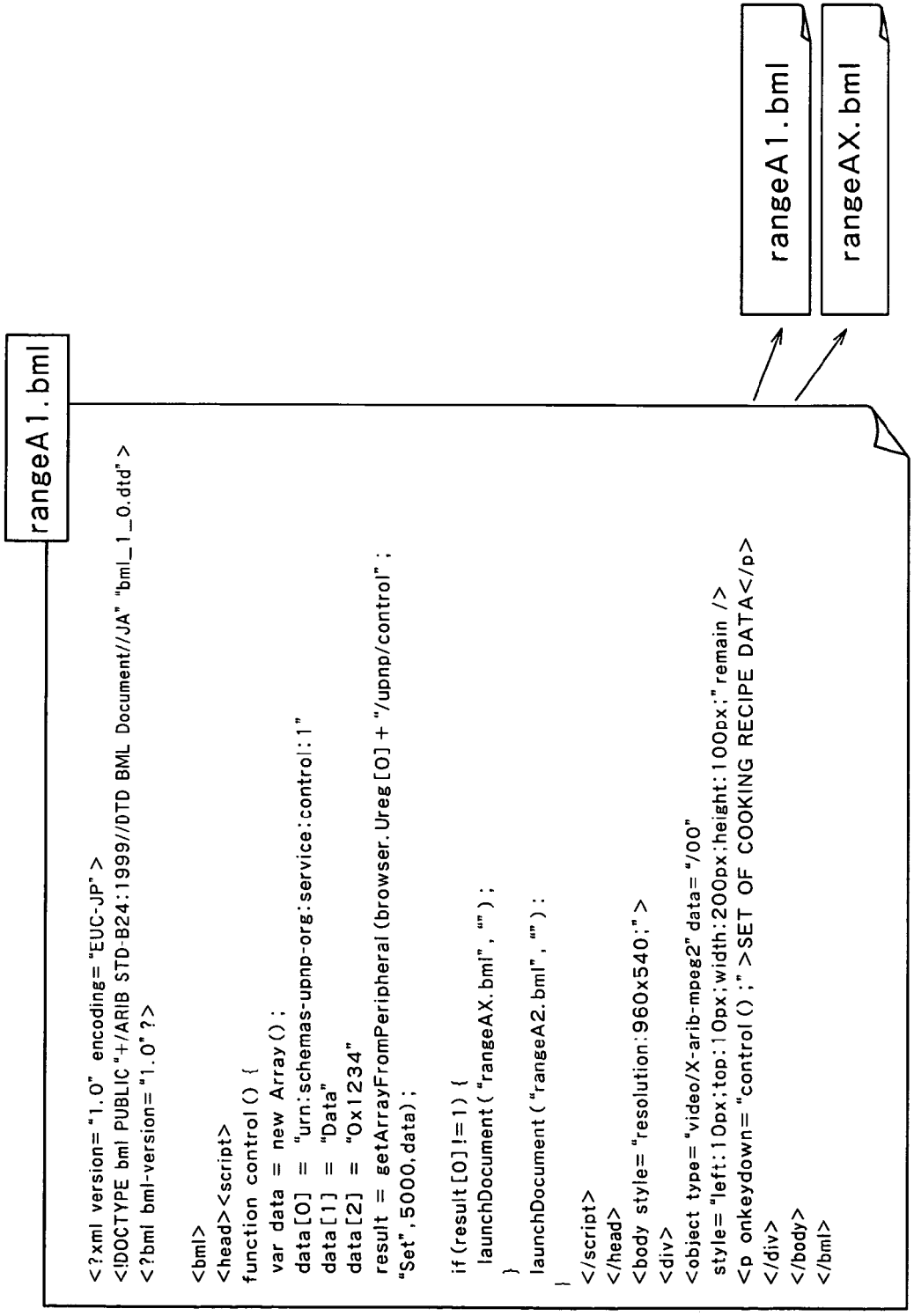
FIG. 21 is a diagram showing another example of the BML document in the modification of the embodiment.

FIG. 21 is a diagram showing a BML document rangeA1.bml to control the microwave oven A106. In the BML document, the external device control function getArrayFromPeripheral( ) is called by a function control( ) to control the microwave oven A106.

In the case where the function control( ) is designated to onkeydown attribute of p element, the function control( ) is executed when a user selects a button "set cooking recipe data" displayed on the digital television 104 and depresses a button of the remote controller of the digital television 104. In the function control( ), since it is known that the microwave oven A106 has a machine type of microwave oven A, the argument for the microwave oven A106 can be directly described in advance as shown in FIG. 21. Since the value of controlURL includes an IP address and a port number, the value must be variable. However, when URLBase is stored in Ureg[0] by Startup.bml as shown in FIG. 20, the above can be realized by reading the value in Ureg[0]. When the return value result[0] is not "1", the return value means that the device to be controlled is in state of being not controlled. For this reason, rangeAX.bml is executed by the function launchDocument( ). When the return value result[0] is "1", the return value means that the processing is in state of being normally performed until now. For this reason, rangeA2.bml which is the next BML document is executed.

Figure 22:
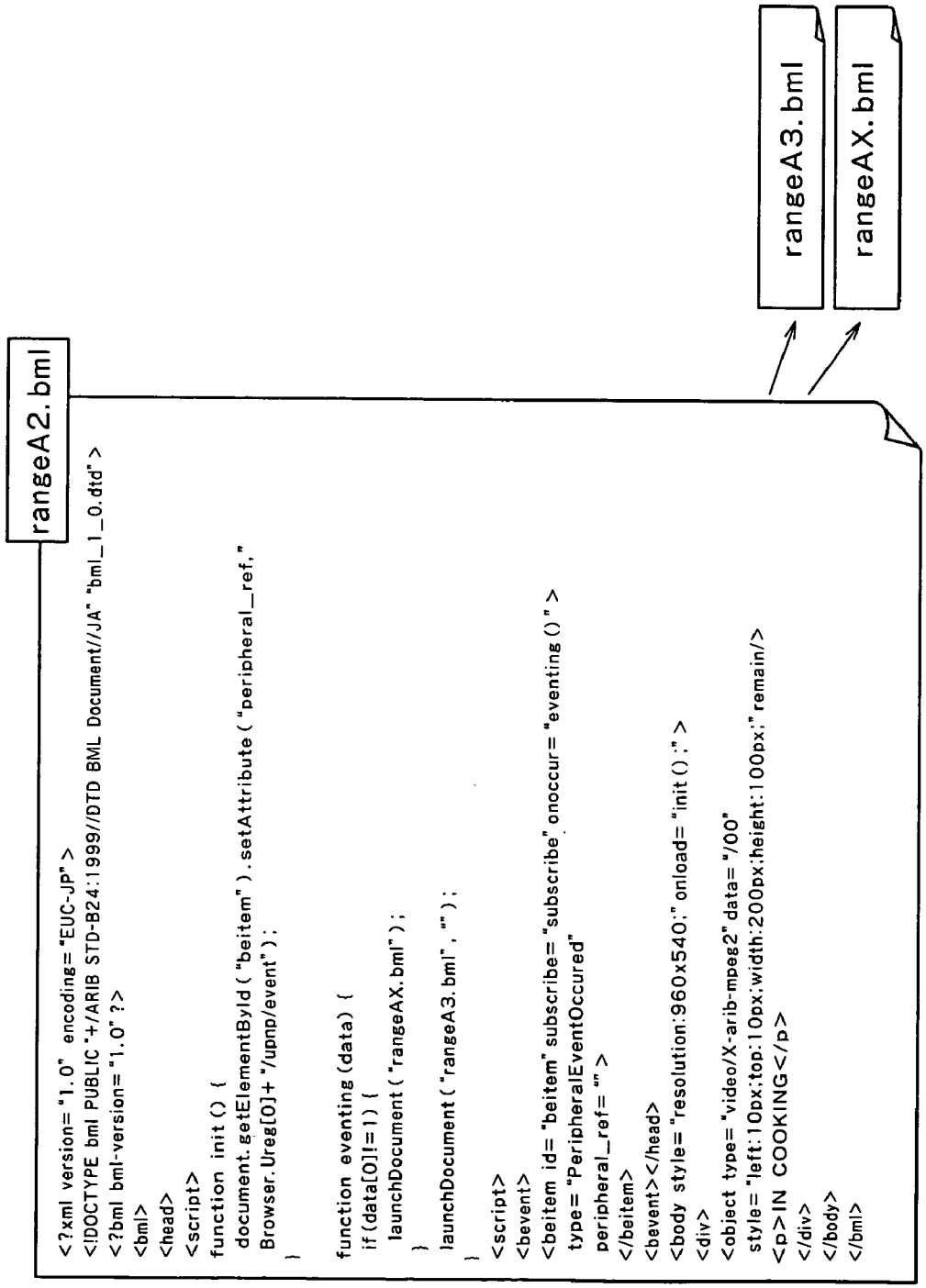
FIG. 22 is a diagram showing still another example of the BML document in the modification of the embodiment.

FIG. 22 is a diagram showing a BML document rangeA2.bml to control the microwave oven A106. In the BML document, a notification from a device compatible with UPnP by beitem element is detected. In designation of beitem, eventSubURL must be designated as a value of peripheral_ref attribute. The eventSubURL is generated by a function init( ) executed in loading of the BML document on the basis of the value of URLBase acquired in FIG. 20. This is set as a value of the peripheral_ref attribute by using the DOM function of BML (section of setAttribute("peripheral_ref", . . . )). Here, after an operation by normal ECMAScript is completed, a notification request by UPnP is performed.

In a function eventing( ) called when a notification or a notification request is failed, the notification request is failed when the value of the argument data[0] is not "1" when the function is called. For this reason, rangeAX.bml is executed by a function launchDocument ( ). When the return value is "1", the return value means that the processing is in state of being normally performed until now. For this reason, a BML document rangeA3.bml to display completion of cooking on the digital television 104 is executed.

As described above, a BML document (for example, Startup.bml) to detect a device is prepared, a broadcast program corresponding to the name or type of the detected device can be broadcasted or selected. A BML document (for example, rangeA1.bml) which handles an appropriate parameter depending on the device or the content of the broadcast program is prepared to make it possible to control the device in cooperation with the broadcast program. Furthermore, when a BML document (for example, rangeA2.bml) which detects that a notification request or a notification occurs is prepared, information notified in accordance with the notification from the device to be controlled is displayed on the screen to make it possible to timely notify a user of the information.

In the modification, the value of URLBase is used to generate controlURL and eventSubURL. However, when the value of URLBase is not included in description, the IP address and port number of LOCATION information may be used, or the value of controlURL in description may be directly used. The processing can be easily realized by using a character string operation function and an XML operation function held by BML as default.

In this modification, depending on detection of a device by using UPnP or a control result of a device to be controlled, a plurality of BML documents can be gradually executed again. As another method, a general-purpose BML document for display is prepared in advance, the content of a predetermined tag of the BML document may be directly updated depending on the control result by using the DOM function such that the content is changed from "in cooking" to "completion of cooking". In this manner, the number of BML documents can be reduced.

In acquisition of a BML document, in the modification, the BML document is delivered through a broadcast wave delivered from the broadcasting station 100. However, the BML document may be partially acquired through the home network 105, the Internet, or satellite communication. Furthermore, as broadcasting contents, not only a moving image of a broadcast program but also a BML document are stored in a hard disk recorder compatible with digital broadcasting installed in a house, and the stored BML document can be used. When a BML document is delivered through digital broadcasting for a mobile object, an on-vehicle system such as an automobile navigation system can be designated to be controlled by the BML document.

When a device can be controlled from the outside, security must be considered. For example, when the system receives broadcasting contents which are maliciously created, the system may perform an operation which is unintended by a user. However, due to the nature of digital broadcasting supposed by the present invention, it is considered that contents with device control are always created and delivered by only the broadcasting station 100 which is a limited business unit. Therefore, unlike the Internet or the like which can be easily interposed by the third party, the possibility of receiving delivered malicious contents which abnormally operate may be low. For this reason, a risk in security is supposed to be suppressed to the minimum level. With respect to acquisition of a BML document from the Internet, on the standard of BML, the broadcasting station 100 which is a creator of broadcasting contents acquires the BML document from a designated URL. For this reason, it is considered that interposition by the third party is difficult.

What is claimed is:

1. A device control system connected to a network including an external device, comprising:
    a receiver which receive signals of digital broadcasting including a BML (Broadcast Markup Language) document from a broadcasting station and acquires the BML document from the received signals, the BML document including a description for controlling the external device;
    a communication device which communicates with the external device on the network;
    a BML processor which interprets the description for controlling the external device in the BML document and instructs the communication device to communicate with the external device according to a result of interpretation of the description;

an acquiring unit which acquires a BML document which can be delivered in digital broadcasting;

a BML interpreting unit which interprets a description described in the BML document, for controlling an external device; and a communication unit which communicates with the external device on the basis of a result of interpretation by the BML interpreting unit.

2. The system according to claim 1, wherein the communication unit performs communication in accordance with UPnP (Universal Plug and Play).

3. The system according to claim 2, wherein the communication device transmits a command for device detection to the network and find the external device based on a response from the external device.

4. The system according to claim 2, wherein the communication device transmits a command for device control to the external device to control the external device.

5. The system according to claim 2, wherein the communication device requests the external device to notify an event occurring in the external device and detects an event notification from the external device.

6. A device control method performed in a computer connected to a network including an external device, comprising:

receiving signals of digital broadcasting including a BML (Broadcast Markup Language) document from a broadcasting station and acquiring the BML document from the received signals, the BML document including a description for controlling the external device; and interpreting the description in the BML document for controlling the external device and instructing a communication device to communicate with the external device according to a result of interpretation of the description, the communication device being equipped with the computer and communicating with the external device based on a predetermined protocol.

7. The method according to claim 6, wherein the communicating with the external device is performed in accordance with UPnP (Universal Plug and Play) as the predetermined protocol.

8. The method according to claim 7, wherein the communicating with the external device includes transmitting a command for device detection to the network and finding the external device based on a response from the external device.

9. The method according to claim 7, wherein the communicating with the external device includes transmitting a command for device control to the external device to control the external device.

10. The method according to claim 7, wherein the communicating with the external device includes requesting the external device to notify an event occurring in the external device and detecting an event notification from the external device.

11. A computer readable medium storing a control program for causing a computer connected to a network including an external device to execute instructions to perform the steps of:

receiving signals of digital broadcasting including a BML (Broadcast Markup Language) document from a broadcasting station and acquiring the BML document from the received signals, the BML document including a description for controlling an external device; and interpreting the description in the BML document for controlling the external device and instructing a communication device to communicate with the external device according to a result of interpretation of the description, the communication device being equipped with the computer and communicating with the external device based on a predetermined protocol.

12. The medium according to claim 11, wherein the communicating with the external device is performed in accordance with UPnP (Universal Plug and Play) as the predetermined protocol.

13. The medium according to claim 12, wherein the communicating with the external device includes transmitting a command for device detection to the network and finding the external device based on a response from the external device.

14. The medium according to claim 12, wherein the communicating with the external device includes transmitting a command for device control to the external device to control the external device.

15. The medium according to claim 12, wherein the communicating with the external device includes requesting the external device to notify an event occurring in the external device and detecting an event notification from the external device.

* * * * *